(12) United States Patent
Slusar

(10) Patent No.: US 11,976,930 B2
(45) Date of Patent: *May 7, 2024

(54) ALTERING AUTONOMOUS OR SEMI-AUTONOMOUS VEHICLE OPERATION BASED ON ROUTE TRAVERSAL VALUES

(71) Applicant: Allstate Insurance Company, Northbook, IL (US)

(72) Inventor: Mark V. Slusar, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/929,916

(22) Filed: Sep. 6, 2022

(65) Prior Publication Data

US 2023/0078418 A1 Mar. 16, 2023

Related U.S. Application Data

(63) Continuation of application No. 16/725,080, filed on Dec. 23, 2019, now Pat. No. 11,466,999, which is a
(Continued)

(51) Int. Cl.
*G01C 21/36* (2006.01)
*B60W 30/18* (2012.01)
(Continued)

(52) U.S. Cl.
CPC ........... *G01C 21/362* (2013.01); *B60W 30/18* (2013.01); *B60W 60/0011* (2020.02);
(Continued)

(58) Field of Classification Search
CPC .. G01C 21/362; G01C 21/34; G01C 21/3415; G01C 21/3492; G01C 21/3623;
(Continued)

(56) References Cited

U.S. PATENT DOCUMENTS 7,499,774 B2 3/2009 Barrett et al.
7,979,172 B2 7/2011 Breed
(Continued)

FOREIGN PATENT DOCUMENTS

DE 102011089938 A1 6/2013
WO 2010062899 A1 6/2010
(Continued)

OTHER PUBLICATIONS

Capp & Litkouhi, "The Crash-Proof Car. When cars won't let drivers make mistakes, crashes may become a thing of the past," IEEE Spectrum, http://spectrum.ieee.org/transportation/safety/the-crashproof-car, pp. 1-8.
(Continued)

*Primary Examiner* — Aaron L Troost
(74) *Attorney, Agent, or Firm* — Dinsmore & Shohl LLP

(57) ABSTRACT

A method is disclosed for mitigating the risks associated with operating an autonomous or semi-autonomous vehicle by using calculated route traversal values to select less risky travel routes and/or modify vehicle operation. Various approaches to achieving this risk mitigation are presented. A computing device is configured to generate a database of route traversal values. This device may receive a variety of historical route traversal information, real-time vehicle information, and/or route information from one of more data sources and calculate a route traversal value for the associated driving route. Subsequently, the computing device may provide the associated route traversal value to other devices, such as a vehicle navigation device associated with the autonomous or semi-autonomous vehicle. An insurance company may use this information to help determine insurance premiums for autonomous or semi-autonomous vehicles by analyzing and/or mitigating the risk associated with operating those vehicles.

12 Claims, 9 Drawing Sheets

Related U.S. Application Data continuation of application No. 15/784,922, filed on Oct. 16, 2017, now Pat. No. 10,533,870, which is a continuation of application No. 15/408,938, filed on Jan. 18, 2017, now Pat. No. 9,816,827, which is a continuation of application No. 14/849,045, filed on Sep. 9, 2015, now Pat. No. 9,587,952.

(51) Int. Cl.
| | | |
|---|---|---|
| *B60W 60/00* | (2020.01) | |
| *G01C 21/34* | (2006.01) | |
| *G01S 19/13* | (2010.01) | |
| *G01S 19/42* | (2010.01) | |
| *G06Q 10/00* | (2023.01) | |
| *G06Q 10/047* | (2023.01) | |
| *G06Q 40/08* | (2012.01) | |

(52) U.S. Cl.
CPC ......... *B60W 60/0059* (2020.02); *G01C 21/34* (2013.01); *G01C 21/3415* (2013.01); *G01C 21/3492* (2013.01); *G01C 21/3623* (2013.01); *G01C 21/3691* (2013.01); *G01S 19/42* (2013.01); *G06Q 10/00* (2013.01); *G06Q 10/047* (2013.01); *G06Q 40/08* (2013.01); *B60W 2552/05* (2020.02); *B60W 2556/10* (2020.02); *B60W 2556/65* (2020.02); *G01S 19/13* (2013.01)

(58) Field of Classification Search
CPC . G01C 21/3691; B60W 30/18; B60W 50/082; G06Q 10/10; G06Q 10/047; G06Q 40/08; G01S 19/13; G05D 1/0088; G05D 1/0223
See application file for complete search history.

(56) References Cited

U.S. PATENT DOCUMENTS

| | | | |
|---|---|---|---|
| 7,991,551 B2 | 8/2011 | Samuel et al. | |
| 8,165,806 B2 | 4/2012 | Yasan et al. | |
| 8,301,108 B2 | 10/2012 | Naboulsi | |
| 8,412,445 B2 | 4/2013 | Uyeki | |
| 8,412,449 B2 | 4/2013 | Trepagnier et al. | |
| 8,576,069 B2 | 11/2013 | Nadeem et al. | |
| 8,606,512 B1 | 12/2013 | Bogovich et al. | |
| 8,634,980 B1 | 1/2014 | Urmson et al. | |
| 8,781,669 B1 | 7/2014 | Teller et al. | |
| 8,812,186 B2 | 8/2014 | Oh et al. | |
| 8,823,530 B2 | 9/2014 | Green et al. | |
| 8,849,494 B1 | 9/2014 | Herbach et al. | |
| 8,914,225 B2 | 12/2014 | Caskey et al. | |
| 8,954,217 B1 | 2/2015 | Montemerlo et al. | |
| 10,304,141 B1 | 5/2019 | Healy | |
| 2009/0005979 A1 | 1/2009 | Nakao et al. | |
| 2010/0017236 A1 | 1/2010 | Duddle et al. | |
| 2012/0139755 A1 | 6/2012 | Ginsberg | |
| 2012/0173069 A1* | 7/2012 | Tsimhoni | B60W 50/10 701/25 |
| 2018/0113460 A1 | 4/2018 | Koda et al. | |

FOREIGN PATENT DOCUMENTS

| | | |
|---|---|---|
| WO | 2013006826 A2 | 1/2013 |
| WO | 2014148975 A1 | 9/2014 |

OTHER PUBLICATIONS

Maunsell et al., "Realising the benefits of autonomous vehicles in Australia," accenturedigital Brochure, 2014 pp. 1-16.

Schmitz, Men Mikro Elektronik, "Taking Data Networks on the Road," RTC Magazine, 4 pages.

Smith & Voggenauer-Graf von Bothmer, "The Road Towards the Autonomous Car and its Insurance Implications," http://cgd.swissre.com/risk_dialogue_magazine/Autonomous_cars/The_road_towards_ the . . . , Feb. 4, 2015, Swiss Re, Centre for Global Dialogue, Risk Dialogue Magazine, pp. 1-6.

Thomas, "Mercedes-Benz Innovation. The long-haul truck of the future," https://www.mercedes-benz.com/en/mercedes-benz/innovation/the-long-haul-truck-of-the-, Downloaded Feb. 12, 2016; pp. 1-11.

* cited by examiner

ALTERING AUTONOMOUS OR SEMI-AUTONOMOUS VEHICLE OPERATION BASED ON ROUTE TRAVERSAL VALUES

CROSS-REFERENCE TO RELATED APPLICATIONS

This application is a continuation of U.S. application Ser. No. 16/725,080 filed Dec. 23, 2019, entitled "ALTERING AUTONOMOUS OR SEMI-AUTONOMOUS VEHICLE OPERATION BASED ON ROUTE TRAVERSAL VALUES," which is a continuation of U.S. application Ser. No. 15/784,922 filed Oct. 16, 2017, issued as U.S. Pat. No. 10,533,870 on Jan. 14, 2020, entitled "ALTERING AUTONOMOUS OR SEMI-AUTONOMOUS VEHICLE OPERATION BASED ON ROUTE TRAVERSAL VALUES," which is a continuation of Ser. No. 15/408,938 filed Jan. 18, 2017, issued as U.S. Pat. No. 9,816,827 on Nov. 14, 2017, entitled "ALTERING AUTONOMOUS OR SEMI-AUTONOMOUS VEHICLE OPERATION BASED ON ROUTE TRAVERSAL VALUES," which is a continuation of U.S. application Ser. No. 14/849,045 filed Sep. 9, 2015, issued as U.S. Pat. No. 9,587,952 on Mar. 7, 2017, entitled "ALTERING AUTONOMOUS VEHICLE OPERATION BASED ON ROUTE TRAVERSAL VALUES." The contents of the above noted applications are hereby incorporated by reference in their entirety.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some concepts of the disclosure in a simplified form as a prelude to the description below.

In accordance with some aspects of the disclosure, a computing system is and methods are disclosed for dynamically routing a vehicle, which may be an autonomous vehicle or a semi-autonomous vehicle. The system may receive or otherwise have access to various types of information, including but not limited to, accident information, geographic information, vehicle information, and route traversal information, which may be stored in a data store (e.g., database) and/or received from one or more data sources. Using such information, the system may select one or more routes for routing the vehicle. In making the selection, the system may determine additional information (such as one or more route traversal values) for one or more associated road segments of one or more routes and provide the determined information for the road segment(s). In one embodiment, separate information can be determined for vehicles engaged in autonomous or semi-autonomous driving over the road segment and/or vehicles engaged in manual driving over the road segment. The system may then use the determined information to determine a route for the autonomous or semi-autonomous vehicle. The determined information may also be used to adjust driving characteristics of the autonomous or semi-autonomous vehicle. For example, a vehicle may travel more slowly along a route due to a higher route traversal value. Thus, by assigning certain information (such as route traversal values) to one or more road segments and using that assigned information to select certain routes, the vehicle may follow a route that is considered more (or even most) appropriate for that particular vehicle under certain conditions.

According to further aspects, a first device or system such as a personal navigation device, mobile device, personal computing device, and/or vehicle autonomous (or semi-autonomous) driving system for a first vehicle may be in communication with a second device or system such as another personal navigation device, mobile device, personal computing device, and/or vehicle autonomous (or semi-autonomous) driving system for a second vehicle. Information collected by the system for the second vehicle may be communicated to the first vehicle, which may incorporate this information in to the route traversal value for its travel route. The information communicated between the vehicles may be used to analyze available travel routes and select a route which is more appropriate for the vehicle under the known conditions (e.g., a route that presents less risk of accident).

Example details of these and other aspects of the disclosure are set forth in the accompanying drawings and description below. Other features and advantages of aspects of the disclosure will be apparent from the description and drawings.

BRIEF DESCRIPTION OF THE DRAWINGS

Aspects of the disclosure may take physical form in certain parts and steps, embodiments of which will be described in detail in the following description and illustrated in the accompanying drawings that form a part hereof, wherein.

It will be apparent to one skilled in the art after review of the entirety disclosed that the steps illustrated in the figures listed above may be performed in other than the recited order, and that one or more steps illustrated in these figures may be optional.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

In some embodiments, a personal navigation device, mobile device, personal computing device, and/or vehicle autonomous driving system may communicate with a data store (e.g., database) of information representing route traversal values. The device(s) may receive information about a travel route and use that information to retrieve route traversal values for road segments in the travel route. The aggregate of the route traversal values may be sent for display on a screen of the device and/or for recording in memory of the device. The contents of memory or another data storage device may also be uploaded to a data store for use by, e.g., insurance companies, to determine whether to adjust a quote for insurance coverage or one or more aspects of current insurance coverage such as premium, specific coverages, specific exclusions, rewards, special terms, etc.

Figure 9:
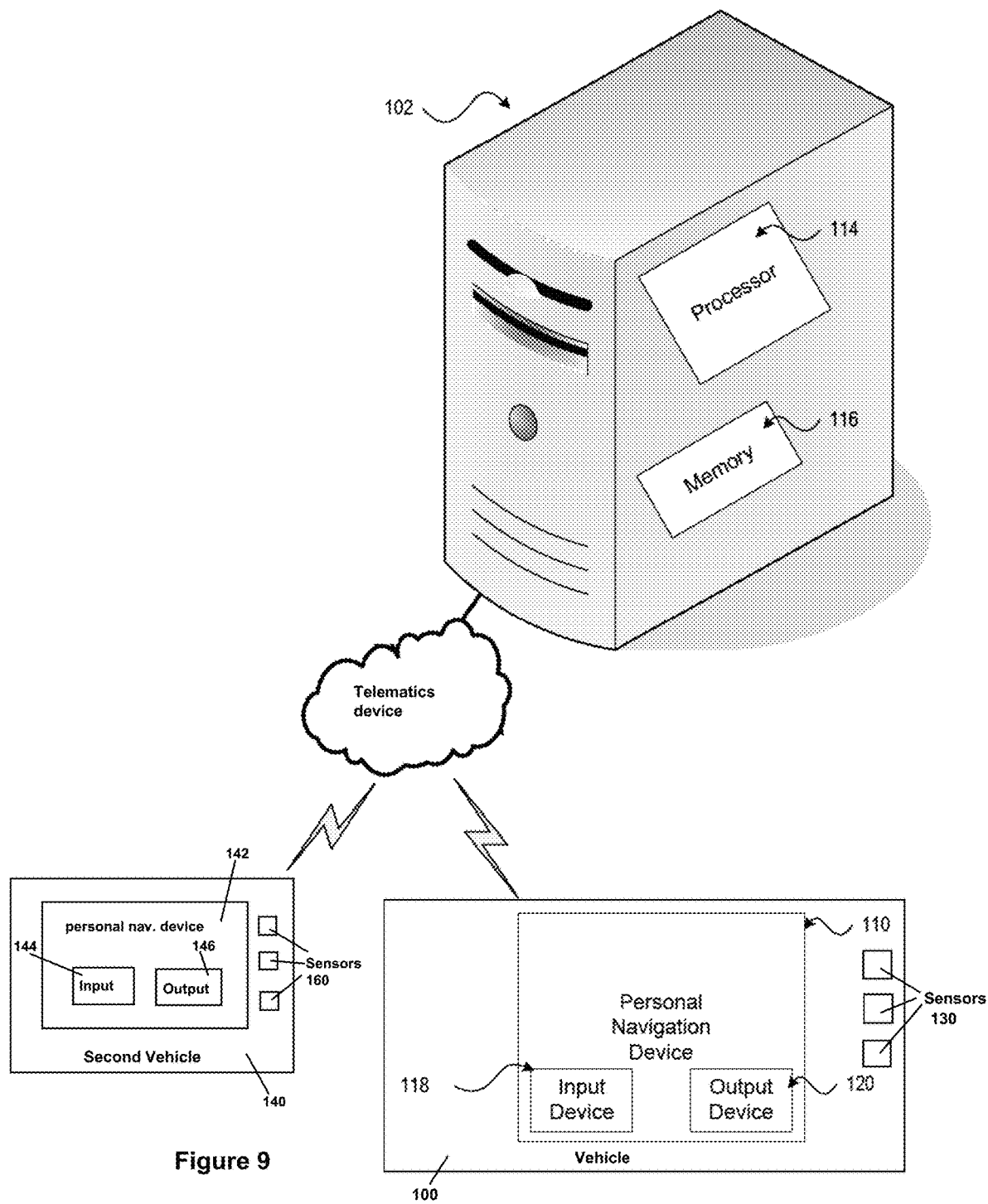
FIG. 9 is a block diagram depicting an illustrative operating environment in communication with a second vehicle, in accordance with aspects of the disclosure.

Route traversal values may be or otherwise include, for instance, one or more values associated with the risks of operating a vehicle, such as a vehicle 100 as shown in FIG. 9, via one or more routes (e.g., roads, waterways, pathways, greenways, trails, flight routes, etc.). The route traversal values may indicate or otherwise depend upon one or more estimated or otherwise determined risks to, e.g., the vehicle, risks to a driver of the vehicle, risks to the driver's property, risks to others, and/or risks to others' property. For example, a busy interstate may have one or more high route traversal values for a car (or other type of vehicle) operated at high speeds. These high route traversal values may represent a high risk of serious injury to a driver of the car, a high chance of damage to the car, and/or a high risk of causing damage to another driver and/or car. As another example, a boat (or other vehicle) may have a low route traversal value when operated at speeds up to 20 MPH, but may have rapidly increasing route traversal values when operated at speeds past 40 MPH due to the difficulties of handling the boat. Route traversal values may also take into account other factors. For example, a boat may have a higher route traversal value when operating on Memorial Day weekend and/or when dragging an inner tube due to the increased chance of collision or personal injury. While cars and boats have been described, a vehicle may be any type of vehicle, including but not limited to a car (which can include a truck of any size, a van, etc.), a boat, a motorcycle, an airplane, a helicopter, a bicycle, a moped, and the like.

In some embodiments, in accordance with aspects of the disclosure, a personal navigation device, mobile device, personal computing device, and/or vehicle autonomous driving system may access the database of route traversal values to assist in identifying and presenting alternate low-risk travel routes. The driver, operator, or autonomous driving system may select among the various travel routes presented, taking into account risk tolerance and/or cost of insurance. Depending on the route selection, the vehicle's insurance policy may be adjusted accordingly, for either the current insurance policy or a future insurance policy.

In certain embodiments, vehicle sensors, vehicle OBD, vehicle communication systems, and/or other devices or systems disclosed herein may collect, transmit, and/or receive data pertaining to autonomous or semi-autonomous driving of the vehicles. In autonomous or semi-autonomous driving, the vehicle fulfills all or part of the driving without being piloted by a human. An autonomous or semi-autonomous car can be also referred to as a driverless car, self-driving car, or robot car. For example, in autonomous or semi-autonomous driving, a vehicle control computer may be configured to operate all or some aspects of the vehicle driving, including but not limited to acceleration, deceleration, steering, and/or route navigation. A vehicle with an autonomous or semi-autonomous driving capability may sense its surroundings using the vehicle sensors and/or receive inputs regarding control of the vehicle from the vehicle communications systems, including but not limited to short range communication systems, telematics, or other vehicle communication systems.

Figure 1:
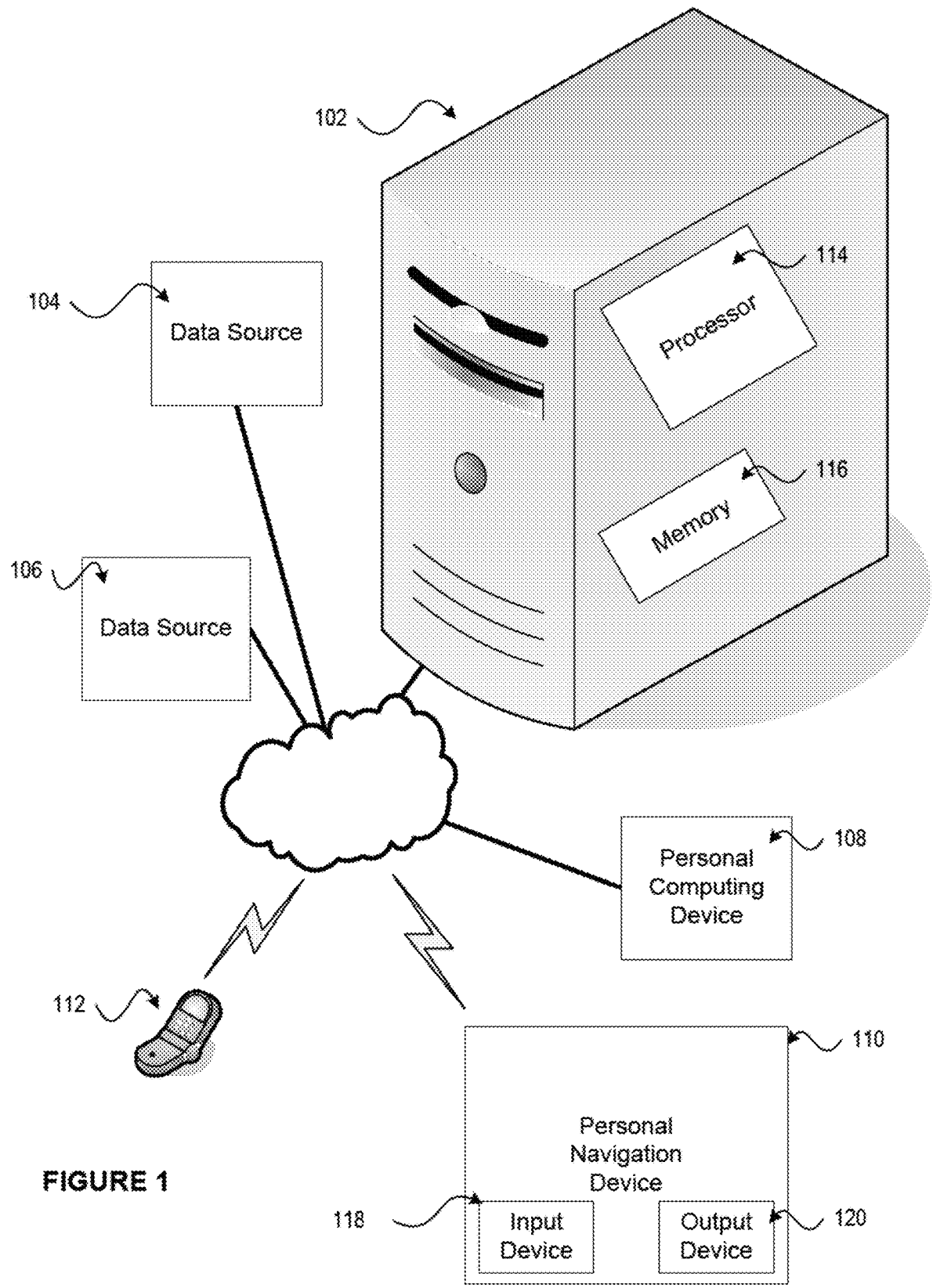
FIG. 1 is a block diagram depicting an illustrative operating environment in accordance with aspects of the disclosure.

Referring to FIG. 1, an example of a suitable operating environment in which various aspects of the disclosure may be implemented is shown in the architectural diagram of FIG. 1. The operating environment is only one example of a suitable operating environment and is not intended to suggest any limitation as to the scope of use or functionality of the disclosures. The operating environment may be comprised of one or more data sources 104, 106 in communication with a computing device 102. The computing device 102 may use information communicated from the data sources 104, 106 to generate values that may be stored in a conventional database format. In one embodiment, the computing device 102 may be a high-end server computer with one or more processors 114 and memory 116 for storing and maintaining the values generated. The memory 116 storing and maintaining the values generated need not be physically located in the computing device 102. Rather, the memory (e.g., ROM, flash memory, hard drive memory, RAID memory, etc.) may be located in a remote data store (e.g., memory storage area) physically located outside the computing device 102, but in communication with the computing device 102.

A personal computing device 108 (e.g., a personal computer, tablet PC, handheld computing device, personal digital assistant, mobile device, etc.) may communicate with the computing device 102. Similarly, a personal navigation device 110 (e.g., a global positioning system (GPS), geographic information system (GIS), satellite navigation system, mobile device, vehicle autonomous or semi-autonomous driving system, other location tracking device, etc.) may communicate with the computing device 102. The communication between the computing device 102 and the other devices 108, 110 may be through wired or wireless communication networks and/or direct links. One or more networks may be in the form of a local area network (LAN) that has one or more of the well-known LAN topologies and may use a variety of different protocols, such as Ethernet. One or more of the networks may be in the form of a wide area network (WAN), such as the Internet. The computing device 102 and other devices (e.g., devices 108, 110) may be connected to one or more of the networks via twisted pair wires, coaxial cable, fiber optics, radio waves or other media. The term "network" as used herein and depicted in the drawings should be broadly interpreted to include not only systems in which devices and/or data sources are coupled together via one or more communication paths, but also stand-alone devices that may be coupled, from time to time, to such systems that have storage capability.

In another embodiment in accordance with aspects of the disclosure, a personal navigation device 110 may operate in a stand-alone manner by locally storing some of the database of values stored in the memory 116 of the computing device 102. For example, a personal navigation device 110 (e.g., a GPS in an automobile or autonomous or semi-autonomous driving system) may comprise a processor, memory, and/or input devices 118/output devices 120 (e.g., keypad, display screen, speaker, etc.). The memory may be comprised of a non-volatile memory that stores a database of values used in calculating an estimated route risk for identified routes. Therefore, the personal navigation device 110 need not communicate with a computing device 102 located at, for example, a remote location in order to calculate identified routes. Rather, the personal navigation device 110 may behave in a stand-alone manner and use its processor to calculate route traversal values of identified routes. If desired, the personal navigation device 110 may be updated with an updated database of values after a period of time (e.g., an annual patch with new route traversal values determined over the prior year).

In yet another embodiment in accordance with aspects of the disclosure, a personal computing device 108 may operate in a stand-alone manner by locally storing some of the database of values stored in the memory 116 of the computing device 102. For example, a personal computing device 108 may be comprised of a processor, memory, input device (e.g., keypad, CD-ROM drive, DVD drive, etc.), and output device (e.g., display screen, printer, speaker, etc.). The memory may be comprised of CD-ROM media that stores values used in calculating an estimated route risk for an identified route. Therefore, the personal computing device 108 may use the input device to read the contents of the CD-ROM media in order to calculate a value for the identified route. Rather, the personal computing device 108 may behave in a stand-alone manner and use its processor to calculate a route traversal value. If desired, the personal computing device 108 may be provided with an updated database of values (e.g., in the form of updated CD-ROM media) after a period of time. One skilled in the art will appreciate that personal computing device 108, 110, 112 need not be personal to a single user; rather, they may be shared among members of a family, company, etc.

The data sources 104, 106 may provide information to the computing device 102. In one embodiment in accordance with aspects of the disclosure, a data source may be a computer which contains memory storing data and is configured to provide information to the computing device 102. Some examples of providers of data sources in accordance with aspects of the disclosure include, but are not limited to, insurance companies, third-party insurance data providers, autonomous or semi-autonomous vehicle operation providers, government entities, state highway patrol departments, local law enforcement agencies, state departments of transportation, federal transportation agencies, traffic information services, road hazard information sources, construction information sources, weather information services, geographic information services, vehicle manufacturers, vehicle safety organizations, and environmental information services. For privacy protection reasons, in some embodiments of the disclosure, access to the information in the data sources 104, 106 may be restricted to only authorized computing devices 102 and for only permissible purposes. For example, access to the data sources 104, 106 may be restricted to only those persons/entities that have signed an agreement (e.g., an electronic agreement) acknowledging their responsibilities with regard to the use and security to be accorded this information.

The computing device 102 uses the information from the data sources 104, 106 to generate values that may be used to calculate an estimated route risk. Some examples of the information that the data sources 104, 106 may provide to the computing device 102 include, but are not limited to, accident information, geographic information, route information, and other types of information useful in generating a database of values for calculating an estimated route risk.

Some examples of accident information include, but are not limited to, loss type, applicable insurance coverage(s) (e.g., bodily injury, property damage, medical/personal injury protection, collision, comprehensive, rental reimbursement, towing), loss cost, number of distinct accidents for the segment, time relevancy validation, cause of loss (e.g., turned left into oncoming traffic, ran through red light, rear-ended while attempting to stop, rear-ended while changing lanes, sideswiped during normal driving, sideswiped while changing lanes, accident caused by tire failure (e.g., blow-out), accident caused by other malfunction of car, rolled over, caught on fire or exploded, immersed into a body of water or liquid, unknown, etc.), impact type (e.g., collision with another automobile, collision with cyclist, collision with pedestrian, collision with animal, collision with parked car, etc.), drugs or alcohol involved, pedestrian involved, wildlife involved, type of wildlife involved, speed of vehicle at time of incident, direction the vehicle is traveling immediately before the incident occurred, date of incident, time of day, night/day indicator (i.e., whether it was night or day at the time of the incident), temperature at time of incident, weather conditions at time of incident (e.g., sunny, downpour rain, light rain, snow, fog, ice, sleet, hail, wind, hurricane, etc.), road conditions at time of incident (e.g., wet pavement, dry pavement, etc.), and location (e.g., geographic coordinates, closest address, zip code, etc.) of vehicle at time of incident, whether the vehicle was engaged in autonomous or semi-autonomous or manual driving when the accident occurred.

In an embodiment, accident information may be categorized. For example, in an embodiment, accident information categories may include an accident type, cause of accident, and/or probable cause of accident. For example, a cause of accident may include loss of vehicle control and/or collision with wildlife. For example, a cause of accident or probable cause of accident may include excess speed and lack vehicle traction on the road.

Accident information associated with vehicle accidents may be stored in a database format and may be compiled per road or route segment. One skilled in the art will understand that the term segment may be interchangeably used to describe a road or route segment, including but not limited to an intersection, round about, bridge, tunnel, ramp, parking lot, railroad crossing, or other feature that a vehicle may encounter along a route.

Time relevancy validation relates to the relevancy of historical accident information associated with a particular location. Time relevancy validation information may be dynamically created by comparing the time frames of accident information to the current date. For example, if a location or route had many collisions prior to five years ago but few since, perhaps a road improvement reduced the risk (such as adding a traffic light). Time relevancy information may be generated remotely and transmitted by a data source 104, 106 to the computing device 102 like other information. Alternatively, time relevancy information may be calculated at the computing device 102 using other information transmitted by a data source 104, 106. For example, the appropriateness of historical information may be related to the time frame into which the information belongs. Examples of time frames may include, but are not limited to, less than 1 year ago, 1 year ago, 2 years ago, 3 years ago, 4 years ago, 5 to 10 years ago, and greater than 10 years ago. In one embodiment, the more recent the historical information, the greater weight is attributed to the information.

Some examples of geographic information include, but are not limited to, location information and attribute information. Examples of attribute information include, but are not limited to, information about characteristics of a corresponding location described by some location information: posted speed limit, construction area indicator (i.e., whether location has construction), topography type (e.g., flat, rolling hills, steep hills, etc.), road type (e.g., residential, interstate, 4-lane separated highway, city street, country road, parking lot, etc.), road feature (e.g., intersection, gentle curve, blind curve, bridge, tunnel), number of intersections, whether a roundabout is present, number of railroad crossings, whether a passing zone is present, whether a merge is present, number of lanes, width of road/lanes, population density, condition of road (e.g., new, worn, severely damaged with sink-holes, severely damaged with erosion, gravel, dirt, paved, etc.), wildlife area, state, county, and/or municipality. Geographic information may also include other attribute information about road segments, intersections, bridges, tunnels, railroad crossings, and other roadway features.

Location information for an intersection may include the latitude and longitude (e.g., geographic coordinates) of the geometric center of the intersection. The location may be described in other embodiments using a closest address to the actual desired location or intersection. The intersection (i.e., location information) may also include information that describes the geographic boundaries, for example, of the intersection which includes all information that is associated within a circular area defined by the coordinates of the center of the intersection and points within a specified radius of the center. In another example of location information, a road segment may be defined by the latitude and longitude of its endpoints and/or an area defined by the road shape and a predetermined offset that forms a polygon. Segments may comprise intersections, bridges, tunnels, rail road crossings or other roadway types and features. Those skilled in the art will recognize that segments can be defined in many ways without departing from the spirit of this disclosed disclosure.

Some examples of vehicle information include, but are not limited to, information that describes vehicles that are associated with incidents (e.g., vehicle accidents, etc.) at a particular location (e.g., a location corresponding to location information describing a segment, intersection, etc.) Vehicle information may include vehicle make, vehicle model, vehicle year, and age. Vehicle information may also include information collected through one or more in-vehicle devices or systems such as an event data recorder (EDR), onboard diagnostic system, global positioning satellite (GPS) device, vehicle autonomous or semi-autonomous driving system; examples of this information include speed at impact, brakes applied, throttle position, direction at impact, whether the vehicle is engaged in manual or autonomous or semi-autonomous driving. As is clear from the preceding examples, vehicle information may also include information about the driver of a vehicle being driven at the time of an incident. Other examples of driver information may include age, gender, marital status, occupation, alcohol level in blood, credit score, distance from home, cell phone usage (i.e., whether the driver was using a cell phone at the time of the incident), number of occupants.

In one embodiment in accordance with aspects of the disclosure, a data source 104 may provide the computing device 102 with accident information that is used to generate values (e.g., create new values and/or update existing values). The computing device 102 may use at least part of the received accident information to calculate a value, associate the value with a road segment (or other location information), and store the value in a database format. One skilled in the art will appreciate, after thorough review of the entirety disclosed herein, that there may be other types of information that may be useful in generating a database of values for use in, among other things, calculating an estimated route risk.

For example, in accordance with aspects of the disclosure, a data source 104 may provide the computing device 102 with geographic information that is used to generate new roadway feature route traversal values in a database of route traversal values and/or update existing route traversal values; where the roadway feature may comprise intersections, road segments, tunnels, bridges, or railroad crossings. Attributes associated with roadways may also be used in part to generate route traversal values. The computing device 102 may use at least part of the received geographic information to calculate a value, associate the value with a road segment (or other location information), and store the value in a database format. Numerous examples of geographic information were provided above. For example, a computing device 102 may receive geographic information corresponding to a road segment comprising accident information and roadway feature information and then calculate a route traversal value. Therefore, when calculating a route traversal value, the system may use, in one example, the geographic information and the accident information (if any accident information is provided). In some embodiments in accordance with aspects of the disclosure, the computing device may use accident information, geographic information, vehicle information, and/or other information, either alone or in combination, in calculating route traversal values in a database format.

The values generated by the computing device 102 may be associated with a road segment containing the accident location and stored in a data store. Similar to a point of interest (POI) stored in GPS systems, a point of risk (POR) is a road segment or point on a map that has risk information associated with it. Points of risk may arise because incidents (e.g., accidents) have occurred at these points before. In accordance with aspects of the disclosure, the road segment may be a predetermined length (e.g., ¼ mile) on a stretch of road. Alternatively, road segments may be points (i.e., where the predetermined length is minimal) on a road. Furthermore, in some embodiments, road segment may include one or more different roads that are no farther than a predetermined radius from a road segment identifier. Such an embodiment may be beneficial in a location, for example, where an unusually large number of streets intersect, and it may be impractical to designate a single road for a road segment.

Figure 2:
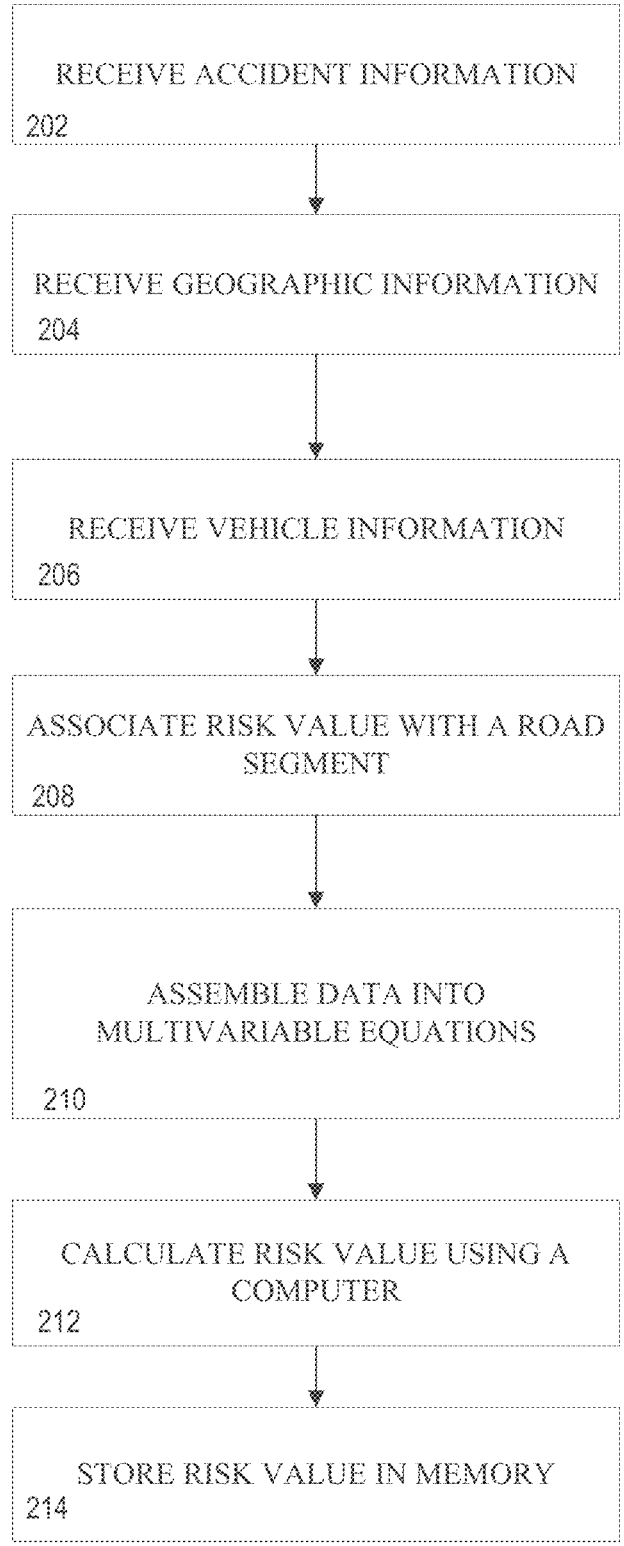
FIG. 2 is a flow chart depicting illustrative steps for calculating a route traversal value of a route in accordance with aspects of the disclosure.

Referring to FIG. 2, in accordance with aspects of the disclosure, a computing device 102 may receive accident information (in step 202), geographic information (in step 204), and/or vehicle information (in step 206). The computing device 102 may calculate (in step 212) the route traversal value for a road segment (or point of risk) by applying actuarial techniques to the information that may be received from data sources 104, 106. In one embodiment, the computing device 102 receives and stores the accident information in a data store with the latitude/longitude and time of the incident. The accident data is associated with a location and combined with other accident data associated with the same location (in step 210). Applying actuarial and/or statistical modeling techniques involving multiple predictors, such as generalized linear models and non-linear models, a route traversal value may be calculated (212), and the calculated route traversal value may be recorded in memory (116) (in step 214). The multiple predictors involved in the statistical model used to calculate a route traversal value may include accident information, geographic information, and vehicle information, including whether the vehicle was operating autonomously or manually at the time of the accident. Associating the route traversal value (in step 208) with a line segment and/or point which best pinpoints the area of the road in which the incident(s) occurred may be accomplished by using established GIS locating technology (e.g., GPS ascertaining a geographically determinable address, and assigning the data file to a segment's or intersection's formal address determined by the system). For example, two or more accidents located in an intersection or road segment may have slightly different addresses depending on where within the intersection or segment the accident location was determined to be. Therefore, the system may identify a location based on business rules. In another example business rules may identify an incident location using the address of the nearest intersection. In yet another example the system may identify the location of an incident on a highway using segments based on mileage markers or the lengths may be dynamically determined by creating segment lengths based on relatively equal normalized route traversal values. Therefore, roadways that have stretches with higher numbers of accidents may have shorter segments than stretches that have fewer accidents. In another example, if the incident occurred in a parking lot, the entire parking lot may be associated with a formal address that includes all accidents located within a determined area. One skilled in the art will appreciate after review of the entirety disclosed that road segment includes a segment of road, a point on a road, and other designations of a location (e.g., an entire parking lot).

For example, an insurance claim-handling processor may collect data about numerous incidents such as collision, theft, weather damage, and other events that cause any one of (or combination of) personal injury, vehicle damage, and damage to other vehicles or property. Information about the accident may be collected through artifacts such as first notice of loss (FNOL) reports and claim adjuster reports and may be stored in one or more data stores used by the insurer. Other data may also be collected at the point and time when the incident occurred, and this information (e.g., weather conditions, traffic conditions, vehicle speed, etc.) may be stored with the other accident information. The information in these data stores may be distributed by data sources 104, 106 in accordance with aspects of the disclosure. In addition, some information may also be recorded in third-party data sources that may be accessible to one or more insurance companies. For example, traffic information (e.g., traffic volume) and weather information may be retrieved in real-time (or near real-time) from their respective data sources.

Figure 3:
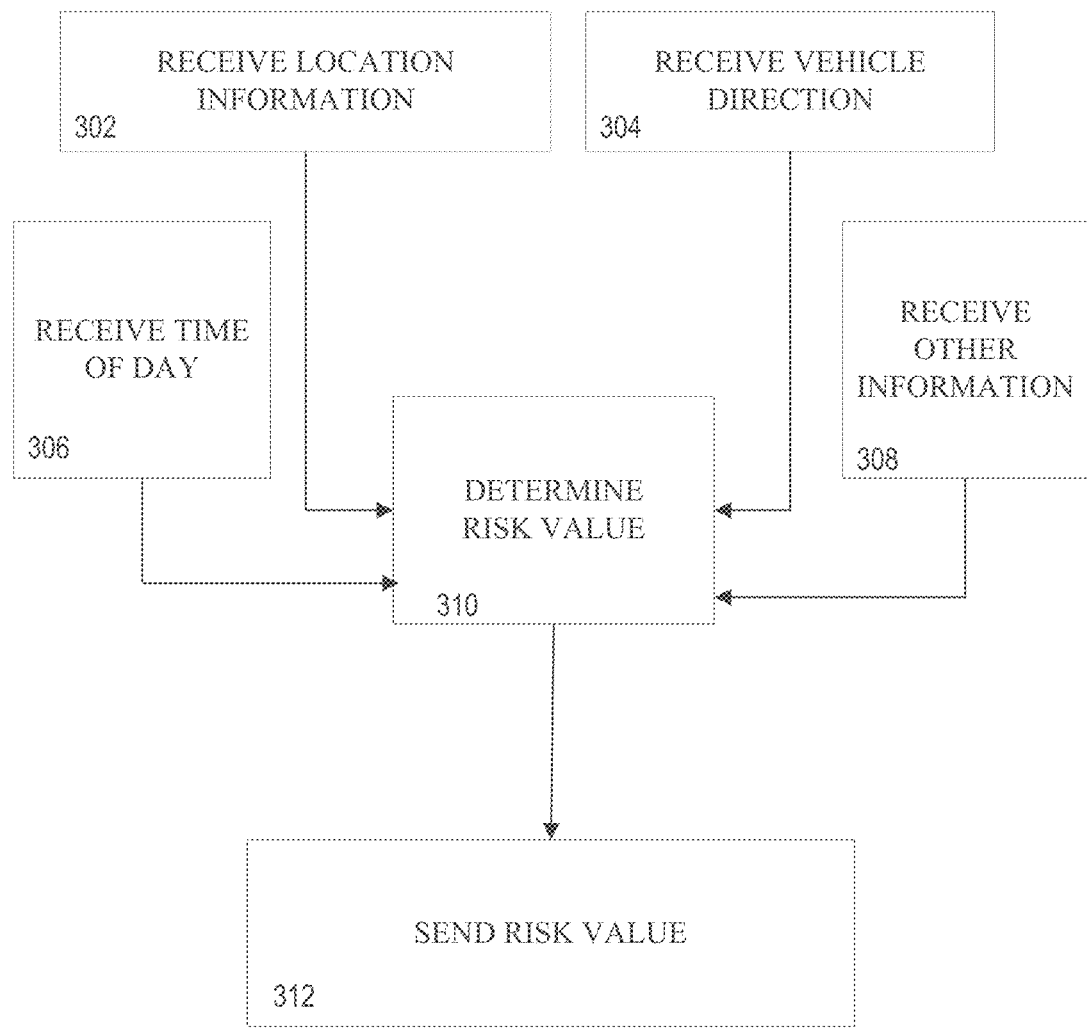
FIG. 3 is a flow chart depicting illustrative steps for determining and providing route traversal values to a computing device in accordance with aspects of the disclosure.

Referring to FIG. 3, in accordance with aspects of the disclosure, the computing device 102 may send (in step 312) the route traversal value corresponding to a road segment when it receives location information (in step 302) requesting the risk associated with a particular location. The particular location information may be in the form of longitude/latitude coordinates, street address, intersection, closest address, or other form of information. Furthermore, in some embodiments the accuracy of the route traversal value may be improved by submitting the direction that a vehicle travels (or may travel) through a road segment. The computing device 102 may receive (in step 304) the vehicle direction and use it to determine the route traversal value associated with the vehicle route. For example, a dangerous intersection demonstrates high risk to a vehicle/driver that passes through it. However, actuarial analysis (e.g., of data showing many recorded accidents at the location) may show that it is more dangerous if the driver is traveling northbound on the road segment and turns left. Therefore, the vehicle direction may also be considered when retrieving the appropriate route traversal value (in step 310).

Likewise, the computing device 102 may also receive (in step 308) other information to enhance the accuracy of the route traversal value associated with a travel route. For example, the computing device 102 may receive (in step 306) the time of day when the driver is driving (or plans to drive) through a particular travel route. This information may improve the accuracy of the route traversal value retrieved (in step 310) for the travel route. For example, a particular segment of road through a wilderness area may have a higher rate of accidents involving deer during the night hours, but no accidents during the daylight hours. Therefore, the time of day may also be considered when retrieving the appropriate route traversal value (in step 310). In addition, the computing device may receive (in step 308) other information to improve the accuracy of the route traversal value retrieved (in step 310) for a travel route. Some examples of this other information include, but are not limited to, the vehicle's speed (e.g., a vehicle without a sport suspension attempting to take a dangerous curve at a high speed), vehicle's speed compared to the posted speed limit, etc.

In accordance with aspects of the disclosure, a computer-readable medium storing computer-executable instructions for performing the steps depicted in FIGS. 2 and 3 and/or described in the present disclosure is contemplated. The computer-executable instructions may be configured for execution by a processor (e.g., processor 114 in computing device 102) and stored in a memory (e.g., memory 116 in computing device 102). Furthermore, as explained earlier, the computer-readable medium may be embodied in a non-volatile memory (e.g., in a memory in personal navigation device 110) or portable media (e.g., CD-ROM, DVD-ROM, USB flash, etc. connected to personal computing device 108).

In accordance with aspects of the disclosure, a personal navigation device 110 may calculate a route traversal value for a travel route of a vehicle. The personal navigation device 110 may be located, for example, in a driver's vehicle, as a component of an autonomous or semi-autonomous driving system, or in a mobile device 112 with location tracking capabilities. Alternatively, a personal computing device 108 may be used to calculate the route traversal value for a travel route of a vehicle.

Figure 4:
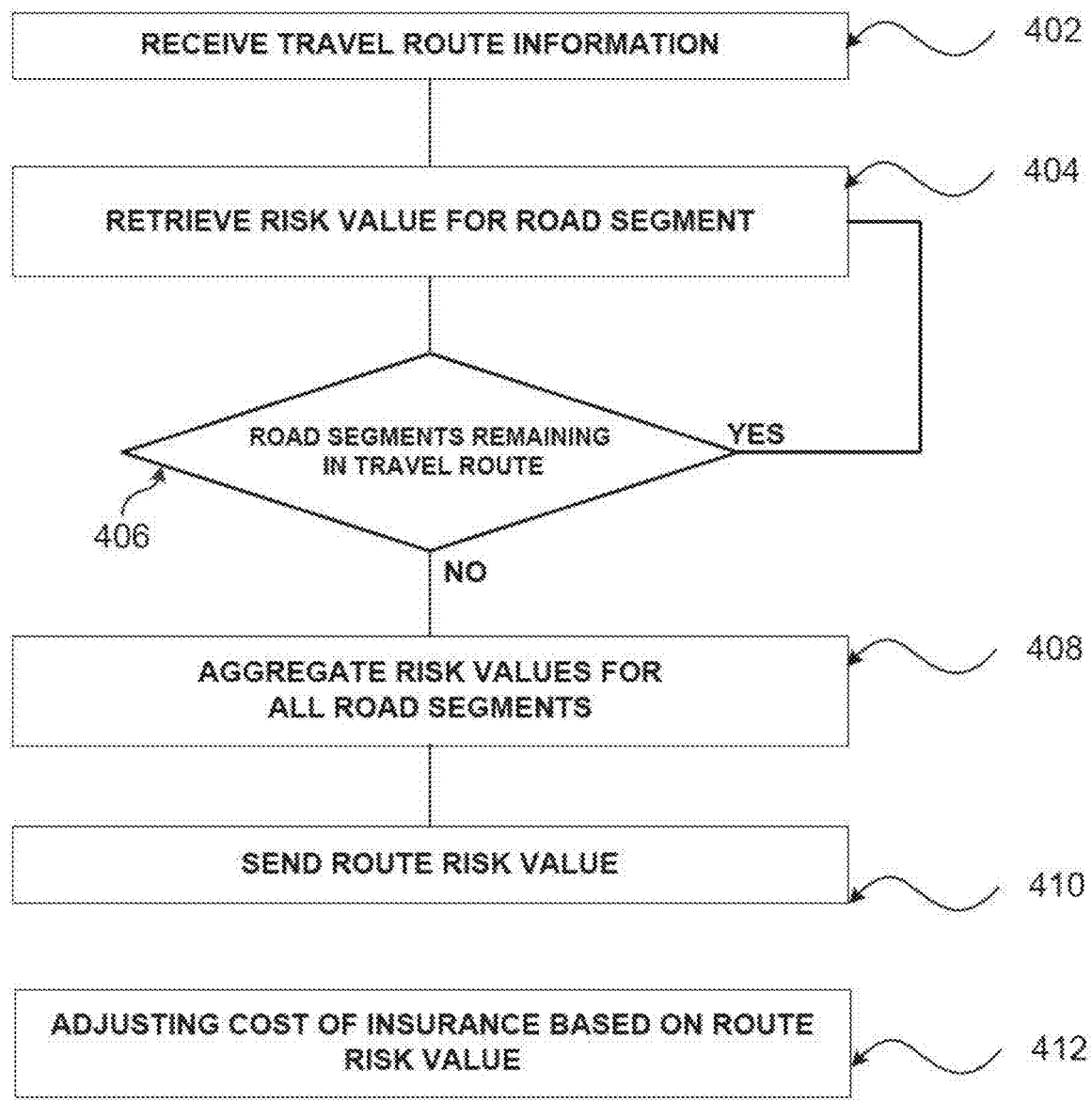
FIG. 4 is a flow chart depicting illustrative steps for calculating the route traversal value of a travel route in accordance with aspects of the disclosure.

For example, referring to FIG. 4, a personal navigation device 110 may receive (in step 402) travel route information. The travel route information may include, but is not limited to, a start location, end location, road-by-road directions, and/or turn-by-turn directions. The personal navigation device 110 may use the travel route information and mapping software to determine the road segment upon which the vehicle will travel, and retrieve (in step 404) the route traversal value for that road segment. For each subsequent road segment remaining in the travel route (see step 406), the personal navigation device 110 may access the database of route traversal values to retrieve (in step 404) the route traversal value for that road segment. As explained earlier, the database of route traversal values may be stored locally to the personal navigation device 110, or may be stored remotely and accessed through a wired/wireless link to the data store.

The route traversal values retrieved (in step 404) for the travel route may be aggregated (in step 408) and a total route traversal value for the travel route may be sent (in step 410). In an alternate embodiment, the computing device 102 may count the number of each type of road risk along the travel route based on the values stored in the database. This number may then be multiplied by a risk-rating factor for the respective risk type. A risk type may comprise intersections, locations of past accidents along a route, railroad crossings, merges, roadway class (residential, local, commercial, rural, highways, limited access highways). Other risk types may include proximity to businesses that sell alcohol, churches or bingo parlors.

The sum of this product overall risk types may, in this alternate embodiment, equal the total route traversal value. The total route traversal value may be divided by the distance traveled to determine the route risk category for the travel route. For example, a route risk category may be assigned based on a set of route traversal value ranges for low, medium, and high risk routes.

After being aggregated, the total route traversal value may be sent (in step 410) to a viewable display on the personal navigation device 110. Alternatively, the total route traversal value may be sent (in step 410) to a local/remote memory where it may be recorded and/or monitored. For example, it may be desirable for a safe driver to have her total route traversal value for all travel routes traveled over a time period to be uploaded to an insurance company's data store. The insurance company may then identify the driver as a lower-risk driver (e.g., a driver that travels on statistically lower-risk routes during lower-risk times) and provide the driver/vehicle with a discount and/or credit (in step 412) on an existing insurance policy (or towards a future insurance policy). At least one benefit of the aforementioned is that safe drivers and/or operators having safe autonomous or semi-autonomous driving systems are rewarded appropriately, while high-risk drivers and operators of autonomous or semi-autonomous vehicles are treated accordingly.

In some embodiments in accordance with aspects of the disclosure, the route traversal value sent (in step 410) may be in the form of a number rating the risk of the travel route (e.g., a rating of 1 to 100 where 1 is very low risk and 100 is very high risk). Alternatively, the route traversal value may be in the form of a predetermined category (e.g., low risk, medium risk, and high risk). At least one benefit of displaying the route traversal value in this form is the simplicity of the resulting display for the driver. For example, an enhanced GPS unit may display a route (or segment of a route) in a red color to designate a high risk route, and a route may be displayed in a green color to designate a lower risk route. At least one benefit of a predetermined category for the route traversal value is that it may be used as the means for comparing the amount of risk associated with each travel route when providing alternate routes. In addition, the enhanced GPS unit may alert the driver of a high risk road segment and offer the driver an incentive (e.g., monetary incentive, points, etc.) for avoiding that segment.

In accordance with aspects of the disclosure, a computer-readable medium storing computer-executable instructions for performing the steps depicted in FIGS. 4 and/or described in the present disclosure is contemplated. The computer-executable instructions may be configured for execution by a processor (e.g., a processor in personal navigation device 110) and stored in a memory (e.g., flash memory in device 110).

When retrieving route traversal values, in accordance with aspects of the disclosure, one or more techniques, either alone or in combination, may be used for identifying and calculating the appropriate route traversal value for road segments. For example, under an accident cost severity rating (ACSR) approach, each point of risk has a value which measures how severe the average accident is for each point of risk. The value may be normalized and/or scaled by adjusting the range of the values. For example, under an ACSR approach using a range of values from 1 to 10: considering all accidents that occur in a predetermined area (e.g., road segment, state, zip code, municipality, etc.), the accidents in the top ten percentile of expensive accidents in that territory may get a 10 value and the lowest 10 percentile of costly accidents in that region may get a 1 value. The actual loss cost may be calculated by summing the various itemized loss costs (e.g., bodily injury, property damage, medical/personal injury protection, collision, comprehensive, uninsured/underinsured motorist, rental reimbursement, towing, etc.).

In an alternate embodiment, the ACSR approach may attribute varying weights to the different types of loss costs summed to calculate the actual loss cost. For example, after analyzing the information, certain portions of a loss cost (e.g., medical cost) may indicate risk more accurately than others. The importance of these portions may be weighted more heavily in the final loss cost calculation. Actuarial methods may be used to adjust loss cost data for a segment where a fluke accident may cause the calculated route traversal value to far exceed the route traversal value based on all the other data.

Under the accidents per year (APYR) approach, in accordance with aspects of the disclosure, each point of risk has a route traversal value that may reflect the average number of accidents a year for that individual point of risk. Under a modified APYR approach, the route traversal value for a point of risk continues to reflect the average number of accidents a year, but attributes a lesser weight to accidents that occurred a longer time ago, similar to time relevancy validation (e.g., it gives emphasis to recent accident occurrences over older occurrences).

Under the risk severity (RSR) approach, in accordance with aspects of the disclosure, each point of risk has a route traversal value that may reflect the severity of risk for that individual point of risk. For example, an intersection that is a frequent site of vehicle accident related deaths may warrant a very high route traversal value under the RSR approach. In one embodiment, risk severity rating may be based on accident frequency at intersections or in segments over a determined period of time. In another embodiment, the rating may be based on loss costs associated to intersections and segments. Yet another embodiment may combine accident frequency and severity to form a rating for a segment or intersection. One skilled in the art can recognize that risk severity ratings may be based on one or a combination of factors associated with intersections or segments.

Under the Environmental Risk Variable (ERV) approach, in accordance with aspects of the disclosure, each point of risk has a route traversal value that may reflect any or all information that is not derived from recorded accidents and/or claims, but that may be the (direct or indirect) cause of an accident. In one embodiment, the route traversal value under the ERV approach may be derived from vehicle information transmitted by a data source 104, 106. In an alternate embodiment, the EVR approach may use compound variables based on the presence or absence of multiple risk considerations which are known to frequently, or severely, cause accidents. A compound variable is one that accounts for the interactions of multiple risk considerations, whether environmental or derived from recorded accidents and/or claims. For example, driving through a wildlife crossing zone at dusk may generate a greater route traversal value than driving through this same area at noon. The interaction of time of day and location may be the compound variable. Another example may consider current weather conditions, time of day, day of the year, and topography of the road. A compound variable may be the type of infrequent situation which warrants presenting a verbal warning to a driver (e.g., using a speaker system in a personal navigation device 110 mounted in a vehicle) of a high risk route (e.g., a high risk road segments).

Another possible approach may be to calculate the route traversal value using one or more of the approaches described above divided by the length of the route traveled. This may provide an average route traversal value for use in conjunction with a mileage rating plan. In one embodiment, the system combines route risk and conventional mileage data to calculate risk per mile rating.

In one embodiment, a device in a vehicle (e.g., personal navigation device 110, mobile device 112, etc.) may record and locally store the route and/or the route and time during which a route was traveled. This travel route information may be uploaded via wireless/wired means (e.g., cell phones, manually using a computer port, etc.). This travel route information may be used to automatically query a data source 104, 106 for route rating information and calculate a total route traversal value.

Some accident data may be recorded and locally stored on a device (e.g., personal navigation device 110, mobile device 112, etc.) that provides incident location and a timestamp that can be used to synchronize other data located in data sources 104 and 106. The captured information may be periodically uploaded to computing device 102 for further processing of accident data for updating the road segment database in memory 116. In some embodiments, the other data may include local weather conditions, vehicle density on the roadway, and traffic signal status. Additional information comprising data from an in-vehicle monitoring system (e.g., event data recorder or onboard diagnostic system) may record operational status of the vehicle at the time of the incident. Alternatively, if the vehicle did not have a location tracking device, an insurance claims reporter may enter the address and other information into the data source manually. If the vehicle was configured with an in-vehicle monitoring system that has IEEE 802.11 Wi-Fi capabilities (or any other wireless communication capabilities), the travel route information may be periodically uploaded or uploaded in real-time (or near real-time) via a computer and/or router. The in-vehicle monitoring system may be configured to automatically upload travel route information (and other information) through a home wireless router to a computer. In some advanced monitoring systems, weather and traffic data (and other useful information) may be downloaded (in real-time or near real-time) to the vehicle. In some embodiments, it may be desirable to use mobile devices 112 (with the requisite capabilities) to transmit the information, provide GPS coordinates, and stream in data from other sources.

The risk types described above may be variables in a multivariate model of insurance losses, frequencies, severities, and/or pure premiums. Interactions of the variables may also be considered. The coefficient the model produces for each variable (along with the coefficient for any interaction terms) may be the value to apply to each risk type. The personal navigation device 110 may initially provide the quickest/shortest route from a start location A to an end location B, and then determine the route traversal value by determining either the sum product of the number of each risk type and the value for that risk type or the overall product of the number of each risk type and the value for that risk type. (Traffic and weather conditions could either be included or excluded from the determination of the route traversal value for comparison of routes. If not included, an adjustment may be made to the route traversal value once the route has been traveled). The driver may be presented with an alternate route which is less risky than the initial route calculated. The personal navigation device 110 may display the difference in risk between the alternate routes and permit the driver to select the preferred route. In some embodiments in accordance with the disclosure, a driver/vehicle may be provided a monetary benefit (e.g., a credit towards a future insurance policy) for selecting a less risky route.

In one example in accordance with aspects of the disclosure, a driver may enter a starting location and an end location into a personal navigation device 110, including a personal navigation device of an autonomous or semi-autonomous driving system. The personal navigation device 110 may present the driver with an illustrative 2-mile route that travels on a residential road near the following risks: 5 intersections, 3 past accident sites, 1 railroad crossing, and 1 lane merging site. Assuming for illustrative purposes that the following route traversal values apply to the following risk types:

| Risk Type | Risk-rating Factor |
|---|---|
| Intersections | 55 |
| Past Accidents | 30 |
| Railroad Crossing | 5 |
| Merge | 60 |
| Residential Road | 2 per mile |

Then, the route traversal value for the entire 2-mile route may be calculated, in one embodiment of the disclosure, as follows:

| Risk Type | Risk-rating Factor | Count | Product |
|---|---|---|---|
| Intersections | 55 | 5 | 55 * 5 = 275 |
| Past Accidents | 30 | 3 | 30 * 3 = 90 |
| Railroad Crossing | 5 | 1 | 5 * 1 = 5 |
| Merge | 60 | 1 | 60 * 1 = 60 |
| Residential Road | 2 per mile | 2 | 2 * 2 = 4 |
| Sum Total | | | 434 |

Assuming a route traversal value between 0 and 350 (per mile) is categorized as a low-risk route, then the aforementioned 2-mile route's route traversal value of 217 (i.e., 434 divided by 2) classifies it a low-risk route.

In some embodiments, for rating purposes the route traversal value may consider the driving information of the driver/vehicle. For example, the personal navigation device 110 (or other device) may record the route taken, as well as the time of day/month/year, weather conditions, traffic conditions, and the actual speed driven compared to the posted speed limit. The current weather and traffic conditions may be recorded from a data source 104, 106. Weather conditions and traffic conditions may be categorized to determine the risk type to apply. The posted speed limits may be included in the geographic information. For each segment of road with a different posted speed limit, the actual speed driven may be compared to the posted speed limit. The difference may be averaged over the entire distance of the route. In addition, various techniques may be used to handle the amount of time stopped in traffic, at traffic lights, etc. One illustrative technique may be to only count the amount of time spent driving over the speed limit and determine the average speed over the speed limit during that time. Another illustrative method may be to exclude from the total amount of time the portion where the vehicle is not moving. Then, upon completion of the trip, the route traversal value may be calculated and stored in memory along with the other information related to the route risk score and mileage traveled. This information may later be transmitted to an insurance company's data store, as was described above.

In another embodiment in accordance with aspects of the disclosure, real time data may be used to dynamically assign route traversal values to each point of risk. For example, some road segments may have a higher route traversal value when a vehicle travels through at a time when, e.g., snowfall is heavy. In such situations, a dynamic route traversal value may be applied to the road segment to determine the appropriate route traversal value to assign to the route.

In accordance with aspects of the disclosure, insurance policies may interact with one or more systems and/or methods described herein for enabling safe driving and lower rates for insurance policy customers. In addition, various approaches to helping users mitigate risk are presented. In accordance with aspects of the disclosure, a computing device is disclosed for generating route traversal values in a data store. The system may receive various types of information, including but not limited to, accident information, geographic information, and vehicle information, including autonomous driving information, from one or more data sources and calculate a route traversal value for associated road segments. Subsequently, the computing device may provide the associated route traversal value when provided with location information for a road segment such as regional location information and/or other information.

In an embodiment in accordance with aspects of the disclosure, route-dependent pricing uses route traversal values to adjust insurance pricing based on where a vehicle is driven. In this embodiment, an insurance company (or its representatives, e.g., agent) may adjust the price quoted/ charged for an insurance policy based on risk consumed. In this embodiment, a vehicle/driver may be categorized into a risk class (e.g., low-risk, medium-risk, high risk, etc.) and charged for insurance accordingly. For example, the vehicle/ driver may be provided with notification of a credit/debit if the vehicle consumed less/more, respectively, of risk at the end of a policy term than was initially purchased.

In another embodiment: the insurance policy is sold and priced in part based on where a customer falls within a three sigma distribution of route traversal values consumed by all insured per a typical policy period. The policy pricing may be based on an initial assumption of risk to be consumed in the prospective policy period or may be based on risk consumed in a preceding policy period. In a case where the number of route traversal values consumed is greater than estimated, the customer may be billed for the overage at the end of (or during) the policy period. In yet another embodiment, the system may be provided as a pay-as-you-drive coverage where the customer is charged in part based on the actual route traversal values consumed in the billing cycle. The system may include a telematics device that monitors, records, and periodically transmits the consumption of route traversal values to processor 114 that may automatically bill or deduct the cost from an account.

Figure 6:
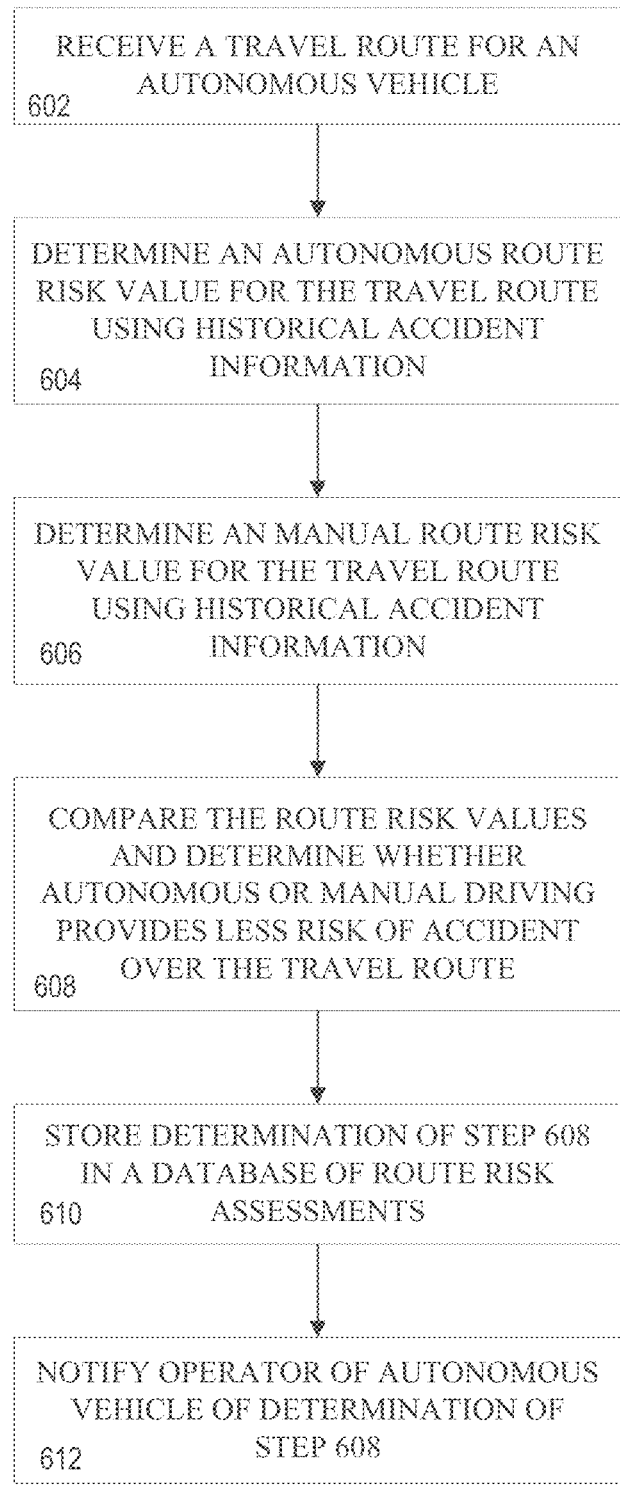
FIG. 6 is a flow chart depicting illustrative steps for analyzing historical accident information in accordance with aspects of the disclosure.

Referring to FIG. 6, in another embodiment, an analysis of historical accident information can be performed to determine whether autonomous or semi-autonomous or manual driving over a travel route provides less risk of accident. In an embodiment, a travel route for an autonomous or semi-autonomous vehicle is received by the system (step 602). An analysis of historical accident information is performed for the travel route. The analysis includes identifying accident information for vehicles engaged in autonomous or semi-autonomous driving over the travel route and accident information for vehicles engaged in manual driving over the travel route. An autonomous route traversal value for the travel route is determined using historical accident information of autonomous or semi-autonomous vehicles engaged in autonomous or semi-autonomous driving over the travel route (step 604). A manual route traversal value for the travel route is determine using historical accident information for vehicles engaged in manual driving over the travel route (step 606). The autonomous route traversal value and the manual route traversal value is compared to determine whether autonomous or semi-autonomous driving or manual driving provides less risk of accident over the travel route (step 608). The determination for the travel route can be stored in a database (step 610) for use in, for example, future risk assessments of the travel route, making driving determinations for an autonomous or semi-autonomous vehicle over the travel route, and/or making manual driving decisions over the travel route. For example, in an embodiment, the determination of whether autonomous or semi-autonomous or manual driving provides less risk of accident over the travel route can be sent in a notification to the driver/operator of the autonomous or semi-autonomous vehicle (step 612).

Figure 7:
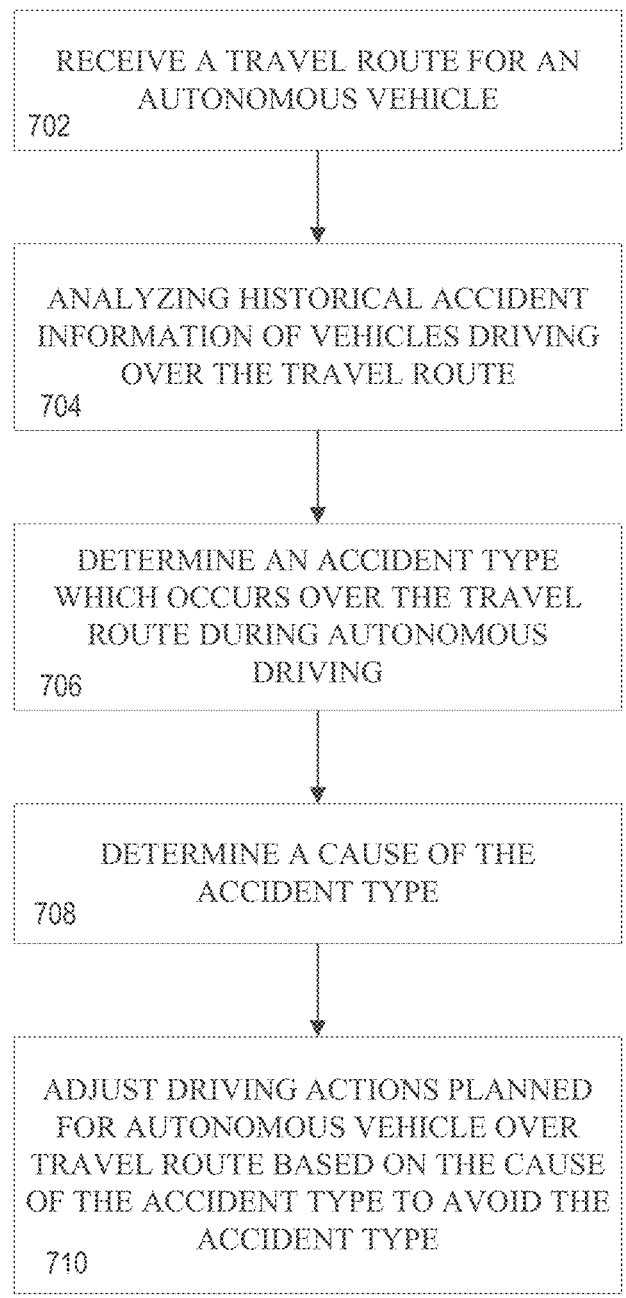
FIG. 7 is a flow chart depicting illustrative steps for analyzing historical accident information to adjust driving actions of an autonomous vehicle over a travel route in accordance with aspects of the disclosure.

Referring to FIG. 7, in an embodiment, historical accident information can be used to adjust driving actions of an autonomous or semi-autonomous vehicle over a travel route in order to avoid accidents which have occurred over the travel route. In an embodiment, a travel route for an autonomous or semi-autonomous vehicle can be received or identified (step 702). Historical accident information for the travel route can be analyzed (step 704) to, for example, determine accident types which occurred over the travel route. The analysis can identify accidents which occurred while driving manually or autonomously (step 706) over the travel route. The analysis can include determining causes and/or probable causes of the accident types which occur over the travel route (step 708). In response to determining accident types and causes/probable causes of the accident types over the travel route, adjustments can be made to the driving actions planned for the autonomous or semi-autonomous vehicle over the travel route (step 710). The adjustments can be made based on the causes/probable causes of the accident types in order to avoid the accident types during travel over the travel route. For example, when a cause/ probable cause of an accident type over a travel route is determined to be excess speed, the adjustment of driving actins planned for the autonomous or semi-autonomous vehicle can include a reduction of speed of travel of the autonomous or semi-autonomous vehicle over the travel route. In addition, for example, when a cause/probable cause of an accident type over a travel route is determined to be lack of vehicle traction on the road, the adjustment of driving actins planned for the autonomous or semi-autonomous vehicle can include engagement of an all-wheel-drive function of the autonomous or semi-autonomous vehicle over the travel route. In addition, for example, when a cause/probable cause of an accident type over a travel route is determined to be a wildlife crossing, the adjustment of driving actins planned for the autonomous or semi-autonomous vehicle can include reduction of a speed of travel and preparations for sudden braking and/or evasive maneuvers over the travel route.

Figure 8:
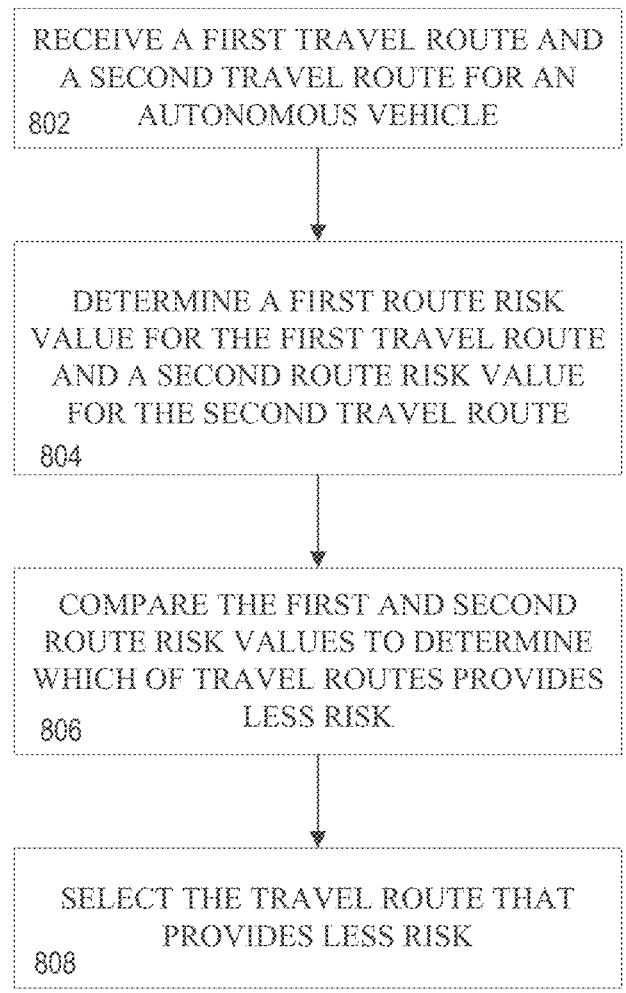
FIG. 8 is a flow chart depicting illustrative steps for analyzing historical accident information to select a travel route in accordance with aspects of the disclosure.

Referring to FIG. 8, in an embodiment, historical accident information can be used to analyze available travel routes and select a route which presents less risk of accident than others. In an embodiment, at least two travel routes can be received by a risk analysis system (step 802). A route traversal value can be determined for each of the travel routes (step 804). The route traversal values for each travel route can be compared to determine which route provides less risk of accident over another (step 806). A driver or autonomous or semi-autonomous driving system can select a travel route on the basis that it provides less risk of accident than another travel route (step 808).

Some aspects of the present disclosure are directed toward methods, computer-readable media, software, systems and systems that provide a vehicle-to-vehicle (V2V) communications system that may be used to collect data from other vehicles. In certain embodiments, the vehicle-to-vehicle communications system involves automated analysis of at least one moving vehicle by at least one other vehicle.

Vehicles in the driving analysis system may be, for example, automobiles, motorcycles, scooters, buses, recreational vehicles, boats, airplanes or other vehicles for which vehicle driving data may be analyzed. The vehicles may or may not be insurance provider customers. The vehicles each include vehicle operation sensors capable of detecting and recording various conditions at the vehicle and operational parameters of the vehicle. For example, sensors may detect and store data corresponding to the vehicle's location (e.g., GPS coordinates), speed and direction, rates of acceleration or braking, and specific instances of sudden acceleration, braking, and swerving. Sensors also may detect and store data received from the vehicle's internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems.

Additional sensors may detect and store the external driving conditions, for example, external temperature, rain, snow, light levels, and sun position for driver visibility. For example, external cameras and proximity sensors may detect other nearby vehicles, traffic levels, road conditions, traffic obstructions, animals, cyclists, pedestrians, and other conditions that may factor into a driving event data analysis. Sensors also may detect and store data relating to moving violations and the observance of traffic signals and signs by the vehicles. Additional sensors may detect and store data relating to the maintenance of the vehicles, such as the engine status, oil level, engine coolant temperature, odometer reading, the level of fuel in the fuel tank, engine revolutions per minute (RPMs), and/or tire pressure.

Vehicles sensors also may include cameras and/or proximity sensors capable of recording additional conditions inside or outside of the vehicles. For example, internal cameras may detect conditions such as the number of the passengers, types of passengers (e.g. adults, children, teenagers, pets, etc.) and identity of passengers in the vehicles, and potential sources of driver distraction within the vehicle (e.g., pets, phone usage, unsecured objects in the vehicle, etc.).

The data collected by vehicle sensors may be stored and/or analyzed within the respective vehicles, and/or may be transmitted to one or more external devices. For example, sensor data may be transmitted via short-range communication systems to other nearby vehicles. Additionally, the sensor data may be transmitted via telematics devices to one or more remote computing devices.

Short-range communication systems are vehicle-based data transmission systems configured to transmit vehicle operational data to other nearby vehicles, and to receive vehicle operational data from other nearby vehicles. In some embodiments, communication systems may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication systems need not use DSRC, and may be implemented using other short-range wireless protocols in other embodiments, such as WLAN communication protocols (e.g., IEEE 802.11), Bluetooth (e.g., IEEE 802.15.1), or one or more of the Communication Access for Land Mobiles (CALM) wireless communication protocols and air interfaces. The vehicle-to-vehicle (V2V) transmissions between the short-range communication systems may be sent via DSRC, Bluetooth, satellite, GSM infrared, IEEE 802.11, WiMAX, RFID, and/or any suitable wireless communication media, standards, and protocols. In certain systems, short-range communication systems may include specialized hardware installed in vehicles (e.g., transceivers, antennas, etc.), while in other examples the communication systems may be implemented using existing vehicle hardware components (e.g., radio and satellite equipment, navigation computers) or may be implemented by software running on the mobile devices of drivers and passengers within the vehicles.

The range of V2V communications between vehicle communication systems may depend on the wireless communication standards and protocols used, the transmission/reception hardware (e.g., transceivers, power sources, antennas, etc.), and other factors. Short-range V2V communications may range from just a few feet to many miles, and different types of driving behaviors may be determined depending on the range of the V2V communications. For example, V2V communications ranging only a few feet may be sufficient for a driving analysis computing device in one vehicle to determine that another vehicle is tailgating or cut-off the vehicle, whereas longer communications may allow the device to determine additional types of driving behaviors (e.g., yielding, defensive avoidance, proper response to a safety hazard, etc.).

V2V communications also may include vehicle-to-infrastructure (V2I) communications, such as transmissions from vehicles to non-vehicle receiving devices, for example, toll booths, rail road crossings, and road-side traffic monitoring devices. Certain V2V communication systems may periodically broadcast data from a vehicle to any other vehicle, or other infrastructure device capable of receiving the communication, within the range of the vehicle's transmission capabilities. For example, a vehicle 210 may periodically broadcast (e.g., every 0.1 second, every 0.5 seconds, every second, every 5 seconds, every 10 seconds, every 20 seconds, every 30 seconds, etc.) certain vehicle operation data via its short-range communication system, regardless of whether or not any other vehicles or reception devices are in range. In other examples, a vehicle communication system may first detect nearby vehicles and receiving devices, and may initialize communication with each by performing a handshaking transaction before beginning to transmit its vehicle operation data to the other vehicles and/or devices.

The types of vehicle operational data, or vehicle driving data, transmitted by vehicles may depend on the protocols and standards used for the V2V communication, the range of communications, and other factors. In certain examples, vehicles may periodically broadcast corresponding sets of similar vehicle driving data, such as the location (which may include an absolute location in GPS coordinates or other coordinate systems, and/or a relative location with respect to another vehicle or a fixed point), speed, and direction of travel. In certain examples, the nodes in a V2V communication system (e.g., vehicles and other reception devices) may use internal clocks with synchronized time signals, and may send transmission times within V2V communications, so that the receiver may calculate its distance from the transmitting node based on the difference between the transmission time and the reception time. The state or usage of the vehicle's 210 controls and instruments may also be transmitted, for example, whether the vehicle is accelerating, braking, turning, and by how much, and/or which of the vehicle's instruments are currently activated by the driver (e.g., head lights, turn signals, hazard lights, cruise control, 4-wheel drive, traction control, etc.). Vehicle warnings such as detection by the vehicle's internal systems that the vehicle is skidding, that an impact has occurred, or that the vehicle's airbags have been deployed, also may be transmitted in V2V communications. In various other examples, any data collected by any vehicle sensors potentially may be transmitted via V2V communication to other nearby vehicles or infrastructure devices receiving V2V communications from communication systems. Further, additional vehicle driving data not from the vehicle's sensors (e.g., vehicle make/model/year information, driver insurance information, driving route information, vehicle maintenance information, driver scores, etc.) may be collected from other data sources, such as a driver's or passenger's mobile device, driving analysis server, and/or another external computer system, and transmitted using V2V communications to nearby vehicles and other receiving devices using communication systems.

The data collected by vehicle sensors also may be transmitted to a driving analysis server, and one or more additional external servers and devices via telematics devices. Telematics devices may be computing devices containing many or all of the hardware/software components as the computing device. As discussed above, the telematics devices may receive vehicle operation data and driving data from vehicle sensors, and may transmit the data to one or more external computer systems (e.g., driving analysis server of an insurance provider, financial institution, or other entity) over a wireless transmission network. Telematics devices also may be configured to detect or determine additional types of data relating to real-time driving and the condition of the vehicles. In certain embodiments, the telematics devices may contain or may be integral with one or more of the vehicle sensors. The telematics devices also may store the type of their respective vehicles, for example, the make, model, trim (or sub-model), year, and/or engine specifications, as well as other information such as vehicle owner or driver information, insurance information, and financing information for the vehicles.

The telematics devices may receive vehicle driving data from vehicle sensors, and may transmit the data to a driving analysis server. However, in other embodiments, one or more of the vehicle sensors may be configured to transmit data directly to a driving analysis server without using a telematics device. For instance, telematics devices may be configured to receive and transmit data from certain vehicle sensors, while other sensors may be configured to directly transmit data to a driving analysis server without using the telematics devices. Thus, telematics devices may be optional in certain embodiments.

The system described in this disclosure for controlling an autonomous or semi-autonomous vehicle may comprise a processor 114 connected to a memory 116, which contains a number of computer-executable instructions and risk information for the desired driving route. The processor is configured to execute the computer-executable instructions and to communicate these instructions to the autonomous or semi-autonomous vehicle via a telematics device. The telematics device is able to communicate with both the processor and the navigation device 110 of the autonomous or semi-autonomous vehicle, in order to share desired route information, including start and end locations, risk information, real-time route and vehicle information, and route alterations between the processor 114 and navigation device 110 of the vehicle. A desired route may be composed of a system of road ways which, when followed, will lead from the start and end locations requested. In certain embodiments, there may be a plurality of routes which may lead from the start location to the end location.

In addition to a vehicle navigation device, the autonomous or semi-autonomous vehicle contains one or more sensors 130 on at least one individual vehicle component. Individual vehicle components may include any area of the vehicle, including parts such as: windshield wipers, tires, brakes, suspension, headlights, brake lights, internal lights, battery, transmission, engine, or any other component of the vehicle or combinations thereof. These sensors are able to communicate with the processor via the telematics device in order to provide real-time route and vehicle information to the processor 114. The processor 114 may continuously recalculate the route traversal value for the driving route 1006 based on the historical route traversal information and vehicle and route information communicated in real-time 1012 and communicate altered route or driving instructions to the vehicle navigation device 110 in order to follow the route with the lowest route traversal value 1010. The sensors communicate this information with the processor as it is detected, i.e. in real-time, as opposed to storing the information that is collected to be communicated at a later time to the processor. The historical route traversal information can consist of a variety of factors to that are taken into consideration by the processor 114 when determining the route with the lowest route traversal value for the route, environment, and vehicle, including, but not limited to, accident information 202, geographic information 204, vehicle information 206, route traversal value associated with a road segment 208, and combinations thereof. The environment may refer to conditions such as: weather conditions, sunlight angle, time of day, temperature, wind speed, road hazards, topography, or other possible conditions external to the vehicle which may affect the route traversal value of the route.

The one or more sensors 130 contained in autonomous or semi-autonomous vehicle may be capable of detecting previously unknown or unforeseen hazards on the selected route and communicate the detected hazard to the processor via the telematics device. For instance, the sensor may detect and gather information about an unknown hazard on the route and be unable to identify the hazard. In this case, the sensor may then communicate the information it was able to gather about the hazard to the processor. Once the processor has received this hazard information, the processor analyzes the hazard information in order to determine the size and type of hazard. The information is then stored in the memory and is assigned a route traversal value. That route traversal value may then be used to recalculate the route traversal value for the driving route and other possible routes in order to determine which has the lowest route traversal value. This calculation is done in real time in order to allow the autonomous or semi-autonomous vehicle to react to the hazard before coming into contact with the hazard. Once this determination is made, the processor may communicate to the vehicle navigation device via the telematics device to stay on the current driving route or to alter the driving route in order to minimize the route traversal value.

In one embodiment, the sensors 130 may include a camera, which may detect a hole on the road on the route. The sensors 130 may then collect information about the hole that the camera detected and may communicate that information to the processor via the telematics device. The processor may then analyze that information using a variety of algorithms. In one instance, the processor may compare the autonomous or semi-autonomous vehicle location on the selected route with risk information about that route previously stored in the memory in order to determine the route traversal value for the hole. In another instance, the processor may analyze the information communicated by the sensor in order to determine the size and severity of the hole and assign it a route traversal value. In yet another instance, the processor may communicate with the vehicle navigation systems of other vehicles which are traveling or have traveled the same route to determine the route traversal value that they calculated for the hole. Once the hole has had a route traversal value assigned to it, the processor may calculate the route traversal value for the current route, including the hole, and compare it to the route traversal value of alternative routes which avoid the hole. The processor then may select the route with the lowest route traversal value, and may alter the current route to avoid the hole or continuing on the current route if the hole is not severe enough to raise the route risk score higher than that of other possible routes.

The sensors 130 may allow the system to identify problems with individual vehicle components and a plurality of individual vehicle components may be controlled by the system. In this embodiment, a sensor on an individual vehicle component may communicate the status of the individual vehicle component with the processor via the telematics device at regular intervals. The processor may analyze the individual vehicle component information against parameters set for each individual vehicle component stored in the memory. The information may also be stored in the memory in order to be used by the processor to determine the typical status of an individual vehicle component or to help anticipate an alteration that may need to be made in advance. The processor may determine through the analysis comparing the parameters and real-time individual vehicle component information that it is necessary to alter the status of the individual vehicle component in order to minimize the route traversal value for the autonomous or semi-autonomous vehicle. The system may then communicate the necessary alteration to the vehicle navigation system via the telematics device. The vehicle navigation system may then communicate with the individual vehicle component in order to complete the alteration in order to minimize the route traversal value.

By identifying problems with individual vehicle components, it allows the system to alter the individual components in order to reduce the route traversal value for the vehicle. Problems with vehicle components may be the result of normal wear-and-tear, unexpected road hazards, previous accidents, or weather conditions. For example, in one embodiment, sensors, such as a moisture detector, may detect that route conditions are unusually wet, for instance if it is raining, and preemptively squeegee the brake pads more often than if weather conditions were dry in order to minimize route traversal value.

In another example, an autonomous or semi-autonomous vehicle may have pressure sensors on each of the tires in order to monitor air pressure in the tires. As the vehicle navigates the route, the pressure sensors constantly communicate the pressure in each of the tires with the processor via the telematics device. Each of those transmissions is analyzed by the processor and stored in the memory in order to determine if the tire pressures are at the optimal level to minimize the route traversal value. If a tire pressure is detected by the pressure sensors, communicated to the processor, and analyzed by the processor as being outside of the optimal tire pressure range, as determined by the parameters stored in the memory, the processor may determine the alteration needed in order to minimize the route traversal value of the vehicle. This alteration may then be communicated to the vehicle navigation device, which may then communicate to the device in the autonomous or semi-autonomous vehicle which controls the pressure of the tires. The device which controls the pressure of the tires may then alter the tire pressure until the pressure sensor communicates a reading to the processor which is analyzed to be within the normal parameters.

As shown in FIG. 9, the vehicle 100 may be outfitted with the personal navigation device 110 already described above. In addition, one or more second vehicles 140 may be outfitted with personal navigation device(s) 142, as also shown in FIG. 9. The processor 114 may communicate with the one or more personal navigation devices 142 of the one or more second vehicles 140 via one or more telematics devices in order to receive, for instance, real-time route and/or vehicle information collected by one or more sensors 160 of the second vehicle(s). The communication between the processor 114 and each of the personal navigation devices 142 of the second vehicles 140 may be facilitated via an input 144 of the respective personal navigation device 142, accepting (e.g., wirelessly) information from the processor 114, and via an output 146 of the respective personal navigation device 142, sending (e.g., wirelessly) information to the processor 114. This feature may be used to recalculate route traversal values for the driving route using the route condition information received from the second vehicle 140 in order to minimize route traversal values associated with the route condition information.

In some embodiments, the second vehicle 140 outfitted with the personal navigation device 142 in communication with the processor 114 may be following the same or a similar route as the vehicle 100. The second vehicle 140 may, for example, detect a previously unknown road hazard via one or more of the sensors 160, which may be, for instance, a camera, and infrared device, radar, and/or the like. The sensors may communicate the detected hazard to the processor via the telematics device. Once the processor has received this hazard information, the processor analyzes the hazard information in order to determine the size and type of hazard. The information is then stored in the memory and is assigned a route traversal value. That route traversal value may then be used to recalculate the route traversal value for the driving route and other possible routes in order to determine which has the lowest route traversal value. This calculation may be done in real time in order to allow the autonomous or semi-autonomous vehicle to react to the hazard before coming into contact with the hazard. After making the determination, the processor may communicate to the vehicle navigation device to stay on the current driving route or to alter the driving route in order to reduce the route traversal value.

The sensor information obtained by the second vehicle 140 may be communicated to the computing device 102 in order to, for instance, collect information regarding hazards or risks recorded by various vehicles and determine risk information for a route. For example, if the second vehicle 140 has encountered a hole (e.g., a pothole in a road), the second vehicle 140 may communicate relevant risk information (such as the dimensions of the hole, the location of the hole, and/or a route traversal value assigned to the hole) to the computing device 102. The computing device 102 may combine the risk information gathered from the second vehicle 140 and/or other vehicles to determine risk information for the hole.

Further, the computing device 102 may aggregate risk information for multiple hazards along a route. The aggregated risk information may comprise individual hazards or other risks associated with a route, and may be used to determine risk information for the route itself. For example, if multiple holes have been reported along a route, the computing device 102 may determine that the route has a high degree of risk due to the severity of the holes. The computing device 102 may then assign a route traversal value to the route involving the holes, based on one or more properties of the holes such as the distribution of the holes (e.g., hole density), the locations of the holes, the sizes of the holes, and/or the quantity of the holes.

The risk information for a route may be used to assist in the operation of vehicles. A vehicle 100 (which may be autonomous or semi-autonomous) may be attempting to travel from a first destination to a second destination. The vehicle 100 may attempt to use a personal navigation device 110 to establish the route between the two destinations. As part of establishing the route, the personal navigation device 110 may communicate with the computing device 102 to determine risk information for one or more possible routes. The personal navigation device 110 may then factor in the risk information into the route.

In one example, a car or other vehicle 100 may wish to travel from one part of an urban area to another part of the urban area. One route may be the fastest, but may have undergone recent construction causing poor road conditions. The personal navigation device 110 of the vehicle 100 may request information regarding the various routes from the computing device 102. Using information gathered by the sensors 130 and/or sensors 160, such as braking information, information regarding the impact with the road, the size of holes, etc., the computing device 102 may determine that the fastest route also has poor road conditions. The computing device 102 may then suggest to the personal navigation device 110 that an alternate, slightly longer route should be taken so as to avoid the poor road conditions. In an autonomous or semi-autonomous vehicle, this may have the advantage of reducing the wear and tear on the vehicle and other risk factors while increasing the comfort level for the driver and/or passengers. If the autonomous vehicle chooses a route independent of the driver, this may be done seamlessly so as to maximize the experience for a vehicle's passengers with minimal intrusion.

In some instances, the risk information could be used to optimize travel along a given route. By using the risk information gathered by one or more vehicles, a future vehicle traveling down a known route may be able to mitigate, and even avoid, certain risk factors. For example, the vehicle 100 may be traveling down a route with a known hole. The navigation systems of the vehicle 100 may be informed by the computing device 102 that the hole exists at a certain location. The vehicle 100 may then deviate from a usual course to avoid the hole, or it may slow down so as to minimize the risk of damage resulting from driving over the hole. This may have the advantage of minimizing risk through automation and digital communications with a repository that may be impossible to achieve for a vehicle dependent upon a human driver for operation.

Autonomous or semi-autonomous vehicles may use collected information to augment automated driving systems. Autonomous or semi-autonomous vehicles may utilize systems to detect and react to the environment. For example, a vehicle 100 may approach a street sign that, because of the angle of the sun, is undetectable by the vehicle sensors 130. In order to determine what the sign says, the vehicle navigation device may examine the sign to determine, for example, text on the sign, the shape of the sign, the color of the sign, and/or the location of the sign. The vehicle 100 may then determine what type of sign it is based on the information and act accordingly. For example, the vehicle 100 may identify a sign as a stop sign, and stop at an intersection.

Shared information may be used to augment this process. When the vehicle 100 stops at the stop sign, it may communicate the location of the stop sign to the computing device 102. A second vehicle 140 may approach the sign. The second vehicle 140 may attempt to read the sign, but may be unable to do so. For example, a setting sun in front of the vehicle may blind the sensors 160, rendering the vehicle 140 incapable of reading the sign. The vehicle 140 may know that a sign is present, but, for example, may be unaware if it is a no parking sign, a yield sign, or a stop sign. The vehicle 140 may then communicate with the computing device 102 to request information regarding the sign. The vehicle 140 may supply information such as geographic location or sensor information to help the computing device 102 identify the sign in question. The computing device 102 may then determine that the sign is the stop sign identified by the vehicle 100, and communicate this information to the vehicle 140. The vehicle 140 may then stop in front of the stop sign. This may have the advantage of reducing the risks of autonomous or semi-autonomous vehicle operation by crowd sourcing risk information between multiple vehicles.

In some instances, information may be shared directly between vehicles. Vehicle to vehicle communication may be used to supply information between vehicles to facilitate better autonomous or semi-autonomous vehicle operation. For example, a first autonomous car may pull up to a sign. After the first autonomous car determines that the sign is a stop sign, it may communicate this information to the vehicles around the first autonomous car. If a second autonomous car pulls up to the sign immediately after the first autonomous car, it may use the information supplied by the first autonomous car to supplement a determination by the second autonomous car that the sign is a stop sign.

A user in the autonomous or semi-autonomous vehicle may be able to override the system in order to begin driving the vehicle manually. If this were to occur, the sensors may, in some embodiments, continue to collect data and transmit the real-time vehicle and route information to the process, including information regarding the decisions made by the user manually controlling the vehicle. The processor may then use that information to determine the route traversal value for the route that the user chose to drive 606, versus the route that the system may have chosen 604, and compare the two routes to determine which has the lower route traversal value 608. The processor may then store the information from this choice in the memory to be used to calculate route traversal values for future driving routes for autonomous and semi-autonomous cars.

In some instances, the user may be able to control the level of risk associated with a vehicle. A computing device 102 may determine different route traversal values for different routes. Further, there may be different route traversal values for different types of driving. For example, a route traversal value may be assigned to traveling at a first speed for a route, and a second route traversal value may be assigned to traveling at a second speed for a route. The user may be presented with the option of selecting which speed and associated route traversal value they wish to use. For example, a user may be running late, and may accept a higher rate of risk.

Different route traversal values for a route may be controlled by or control insurance information for a route. For example, when selecting a route, a user may be presented with the route traversal value for that route. The user may also optionally select driving characteristics, such as traveling faster or more aggressively. This may increase or decrease the route traversal value. After selecting an option, the user may be presented with an insurance cost for traveling on the route, where the insurance cost is based at least in part on the route traversal value for the route and driving characteristics selected.

In some instances, a user may have a preconfigured setting for acceptable route traversal values for a route. For example, a user may have bought a discount insurance that only accepts route traversal values up to a certain level. When selecting a route, an autonomous or semi-autonomous vehicle 100 may request route traversal values associated with the route from the computing device 102. If the route traversal values are higher than a threshold allowed under the user's insurance policy, the autonomous or semi-autonomous vehicle 100 may attempt to find an alternative route that is below the threshold. In some instances, a route may have multiple values associated with different driving characteristics, and the autonomous or semi-autonomous vehicle 100 may select driving characteristics below the threshold. For example, a car may elect to travel on the interstate, but a threshold value may require that the car only travel in the slow lane in order to reduce the chances of a collision.

In some embodiments, an autonomous or semi-autonomous vehicle 100 being driven in a high risk or difficult to maneuver area may be more safely and efficiently navigated. For example, historical route traversal information and real-time route and vehicle information from a second vehicle 140 for driving routes containing roundabouts and parking garages, which are historically difficult for autonomous vehicles to navigate, may allow the vehicle navigation system to improve driving results. Data and information previously collected from other vehicles and routes may be used by the system to continuously improve the driving routes and lower the route traversal value for these difficult to maneuver areas.

Figure 5:
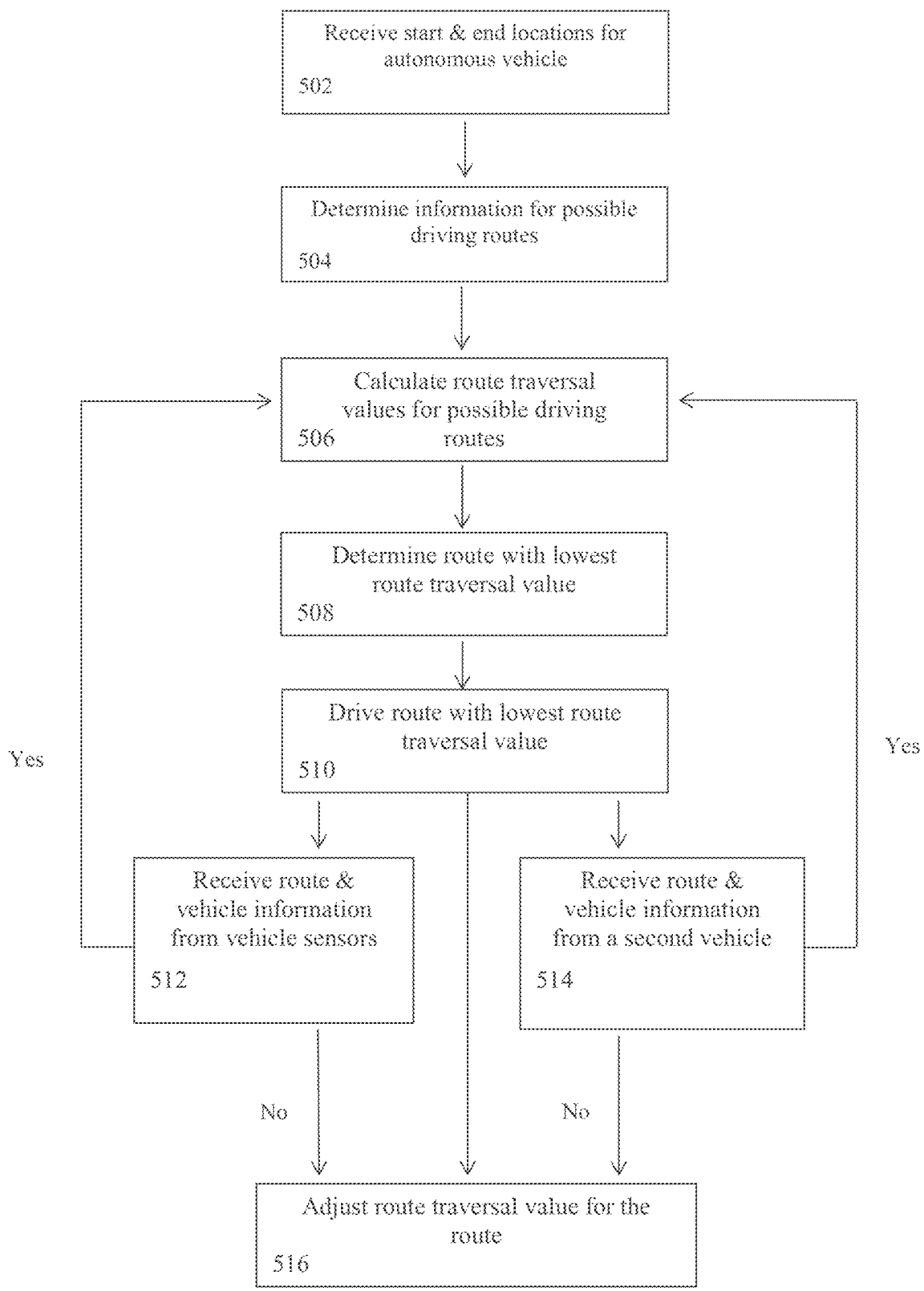
FIG. 5 is a flow chart depicting illustrative steps for calculating and recalculating route traversal values, in accordance with aspects of the disclosure.

FIG. 5 depicts an exemplary method of using and adjusting route traversal values consistent with the disclosures provided herein. The steps depicted in the flow chart of FIG. 5 (as in all of the flow charts discussed herein) are merely illustrative and may be combined, further subdivided, rearranged, and/or omitted as desired. Each of the depicted steps may be performed by any one or more of the elements described herein, such as one or more computing devices and/or systems. At step 502, a system (such as a computing device 102) may receive starting and/or ending locations for the vehicle 100. For example, the personal navigation device 110 may provide starting and/or ending locations selected by a user to the system. At step 504, the system may determine information for possible driving routes. For example, the system may determine one or more reasonable routes between the locations, and historical route traversal information about the routes (i.e., accidents recorded on the routes, road condition information, traffic information, speed information, etc.).

At step 506, the system may determine one or more route traversal values for a plurality of routes, such as for a set of possible (e.g., feasible) routes. The system may determine one or more route traversal values for each route based on, for example, the distance of the route, obstacles along the route, accidents reported along the route, traffic along the route, the length of the route, the speed limit of the route and/or other information. The route traversal values may be specific to (e.g., associated with) certain categories (e.g., time to arrival, distance traveled, risk of an accident, wear on the vehicle, etc.), and/or the risk traversal values may be values computed by weighting information relating to the certain categories. The weights may be dependent on one or more characteristics specified by and/or for the driver and/or another user. For example, a driver may specify that a shorter route is more important than a lower risk. In another example, an insurance policy for the driver may require the driver to take lower risks, and the risk of an accident may be weighted more highly. At step 508, the system may determine the route with the lowest route traversal value. For example, the system may compare the route traversal values for each route and determine the route with the lowest route traversal value. Routes with certain areas or route traversal values above a threshold may be ignored. For example, if the risk of accident is too great, the system may not consider a route even though it has the lowest overall route traversal value.

At step 510, the vehicle 100 may begin traveling down the route with the lowest route traversal value. For example, after receiving an indication of a route with the lowest route traversal value from the system, a vehicle 100 may indicate the route on a personal navigation device 110 and/or automatically begin driving along (or otherwise traversing) the route. As the vehicle travels along the route, the vehicle 100 may capture route and vehicle information via sensors 130. For example, the sensors 130 may detect signage, traffic, bumps in a road, the speed of the vehicle, and/or other such information. At step 512, the route and vehicle information may be transmitted to the system. Route and vehicle information may also be received by the system from a second vehicle 140 in step 514. For example, the second vehicle 140 may relay information to the vehicle 100 via vehicle-to-vehicle communication and/or relay information to the system.

At step 516, the system may adjust the route traversal value for the route. The route traversal value may be adjusted based on new information from vehicles traveling along the route. For example, the system may determine that route has a significant amount of construction, and raise the route traversal value based on information received from the vehicle 100 and a second vehicle 140. The second vehicle 140 may be traveling ahead of the vehicle 100 along the route. If the route traversal value of the route changes, the method may repeat, using the current location of the vehicle 100 as the start location and the preexisting ending location as the end location. The system may then determine a new route by repeating the method as described above.

While the disclosure has been described with respect to specific examples including presently exemplary modes of carrying out the disclosure, those skilled in the art will appreciate that there are numerous variations and permutations of the above-described systems and techniques that fall within the spirit and scope of the disclosure.

The invention claimed is:

1. A system for controlling a vehicle comprising at least one of an autonomous vehicle and a semi-autonomous vehicle, the system comprising:
   a processor configured to execute computer-executable instructions; and
   a memory storing the computer-executable instructions that, when executed by the processor, cause the system to perform steps comprising:
      receiving location information;
      receiving historical route traversal information for a plurality of routes corresponding to the location information;
      receiving a selected route of the plurality of routes;
      displaying, based on receiving the selected route, a plurality of driving characteristic options for the selected route, wherein the plurality of driving characteristic options comprise a plurality of speed options associated with the selected route;
      receiving a selected speed option of the plurality of speed options for the selected route; and
      causing navigation via the selected route at a speed based on the selected speed option.

2. The system of claim 1, wherein the plurality of speed options comprise an option to travel at an elevated speed that is higher than other speed options, and wherein the selected speed option comprises an acceptance of traversing the selected route at the respective adjusted route insurance cost associated with the elevated speed.

3. The system of claim 1, wherein the computer-executable instructions, when executed by the processor, cause the system to perform steps comprising billing a user associated with the vehicle based on the selected route using the selected speed option.

4. The system of claim 1, wherein the computer-executable instructions, when executed by the processor, cause the system to perform steps comprising adjusting at least one individual vehicle component based at least in part upon the selected speed option.

5. The system of claim 1, wherein the system comprises a global positioning satellite (GPS) receiver configured to determine the location information.

6. The system of claim 1, wherein the computer-executable instructions, when executed by the processor, cause the system to perform steps comprising transmitting route information corresponding to the selected route, wherein the route information comprises directional information and route hazard information.

7. The system of claim 1, wherein the computer-executable instructions, when executed by the processor, cause the system to perform steps comprising adjusting the selected route based on a route hazard detected by at least one sensor associated with the vehicle.

8. The system of claim 7, wherein the at least one sensor comprises at least one camera.

9. The system of claim 1, wherein the computer-executable instructions, when executed by the processor, cause the system to perform steps comprising calculating a plurality of route insurance costs based on accident information associated with a road segment, geographic information associated with the road segment, vehicle information associated with the road segment, and a traversal value associated with the road segment.

10. The system of claim 1, wherein the computer-executable instructions, when executed by the processor, cause the system to determine the plurality of routes by determining that a plurality of route insurance costs fall below a maximum cost threshold, wherein the plurality of route insurance costs are adjusted based on the selected route and the selected speed option.

11. The system of claim 1, wherein the computer-executable instructions, when executed by the processor, cause the system to transmit accident information for the vehicle.

12. The system of claim 1, wherein the computer-executable instructions, when executed by the processor, cause the system to calculate a plurality of route insurance costs based on accident information for the vehicle.

* * * * *